United States Patent [19]
Bigley et al.

[11] Patent Number: 5,445,258
[45] Date of Patent: Aug. 29, 1995

[54] PULSE ACTUATED HUB LOCKS AND CONTROL ARRANGEMENT

[75] Inventors: Jon A. Bigley, Milwaukie, Oreg.; Thomas W. Giacomini, Hartland, Mich.; Raymond S. Alvey, Utica, Mich.; Christopher J. Grieco, Farmington Hills, Mich.; Patrick W. Gibson, Northville, Mich.; Dale O. Stollsteimer, W. Bloomfield, Mich.; James C. Kilgore, Detroit, Mich.; Karl W. Wojcik, Sterling Heights, Mich.

[73] Assignee: Warn Industries, Inc., Milwaukie, Oreg.

[21] Appl. No.: 200,181

[22] Filed: Feb. 22, 1994

[51] Int. Cl.$^6$ .................. F16D 43/28; F16D 25/12
[52] U.S. Cl. ................... 192/85 V; 192/85 R; 477/174
[58] Field of Search ............ 192/40, 84 R, 85 R, 192/85 V, 87.11; 477/174; 180/233

[56] References Cited

U.S. PATENT DOCUMENTS

| | | | |
|---|---|---|---|
| 4,960,192 | 10/1990 | Kurihara | 192/85 V X |
| 5,042,627 | 8/1991 | Ishikawa et al. | 192/40 |
| 5,048,635 | 9/1991 | Wakabayashi et al. | 192/40 X |
| 5,056,634 | 10/1991 | Shiba et al. | 192/84 R X |
| 5,330,030 | 7/1994 | Eastman et al. | 180/233 |

*Primary Examiner*—Rodney H. Bonck
*Attorney, Agent, or Firm*—Klarquist, Sparkman, Campbell, Leigh & Whinston

[57] ABSTRACT

A pulse actuated clutch and control arrangement for coupling and decoupling a drive line of a vehicle relative to a wheel such as when shifting between two-wheel and four-wheel drive modes. The pulse actuated clutch has a coupling member that is permanently engaged with one of a driven member and a driving member. The coupling member is movable in a first direction to engage one of the driven and driving members and is movable in a second direction to engage both the driven and driving members. The coupling member is moved in the second direction by a first pulse of air pressure applied thereto. Formations of the piston assembly and the driven member cooperatively latch the piston in the second position to maintain the coupling member in engagement with both the driven and driving members following first pulse of air pressure. A second, greater magnitude pulse of air pressure moves the primary piston further to unlatch the piston and uncouple the driven member from the driving member. The illustrated control arrangement incorporated into a general purpose control module for a vehicle to accomplish pulse actuated control over the clutch mechanism in coordination with other vehicle control activities. The control arrangement makes use of timers and references vehicle conditions to ensure mechanical transition of the pulse actuated clutch mechanism fully into a desired state.

16 Claims, 27 Drawing Sheets

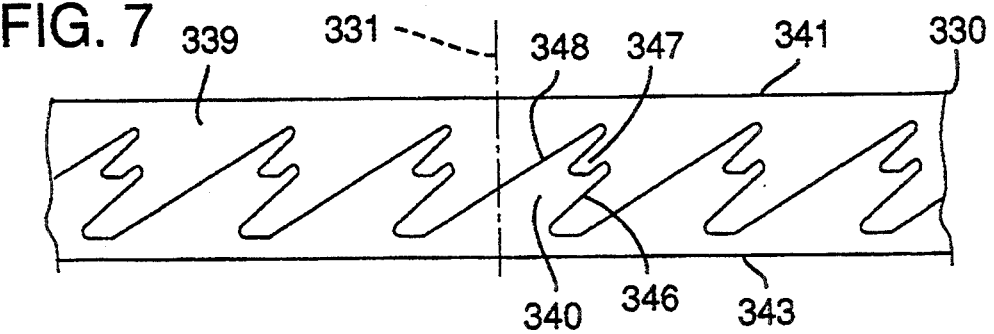
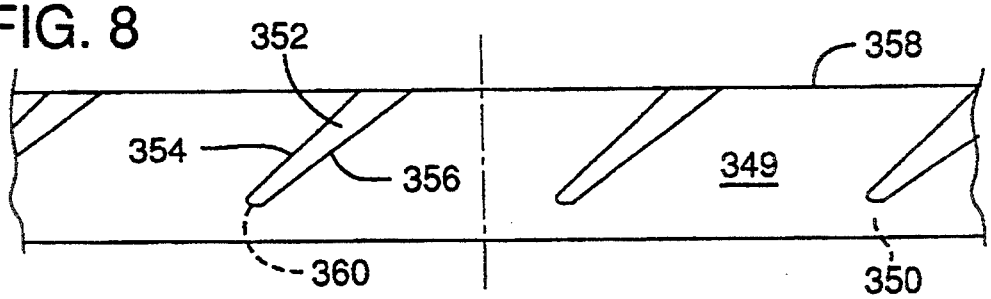
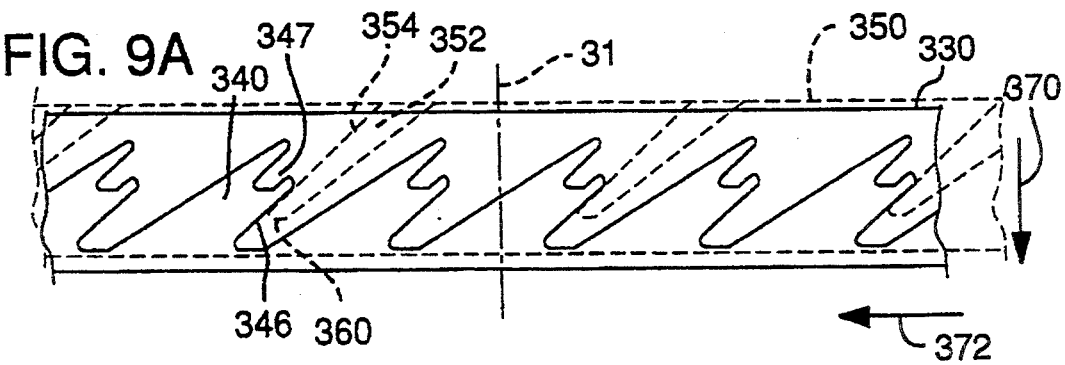
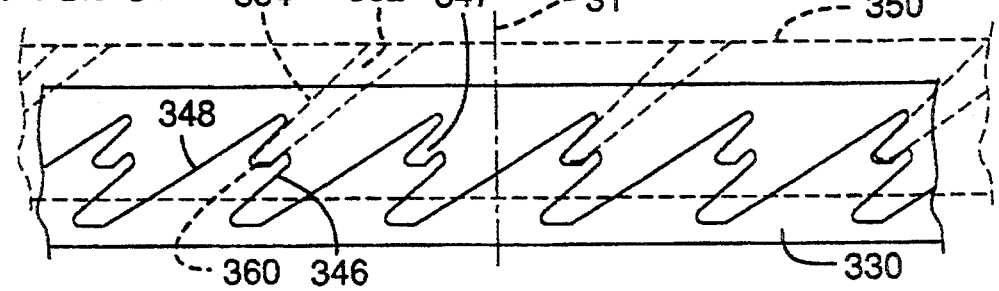
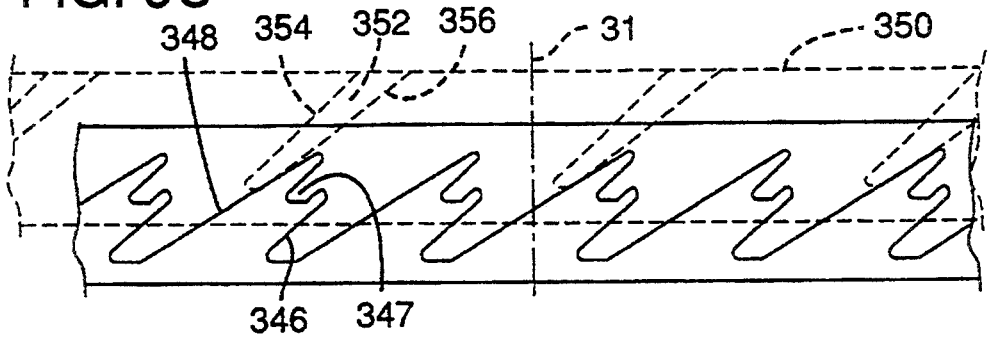

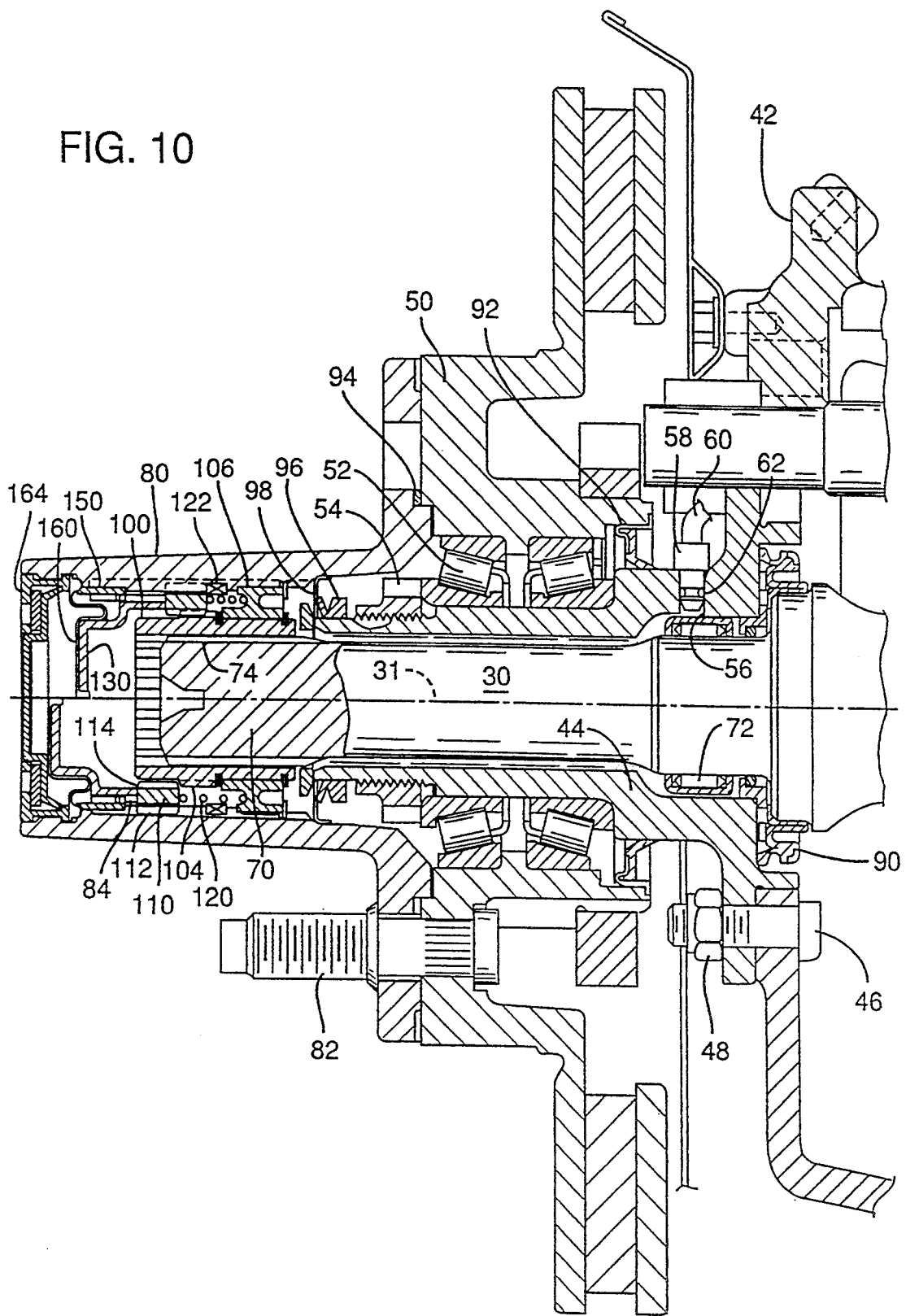

FIG. 11
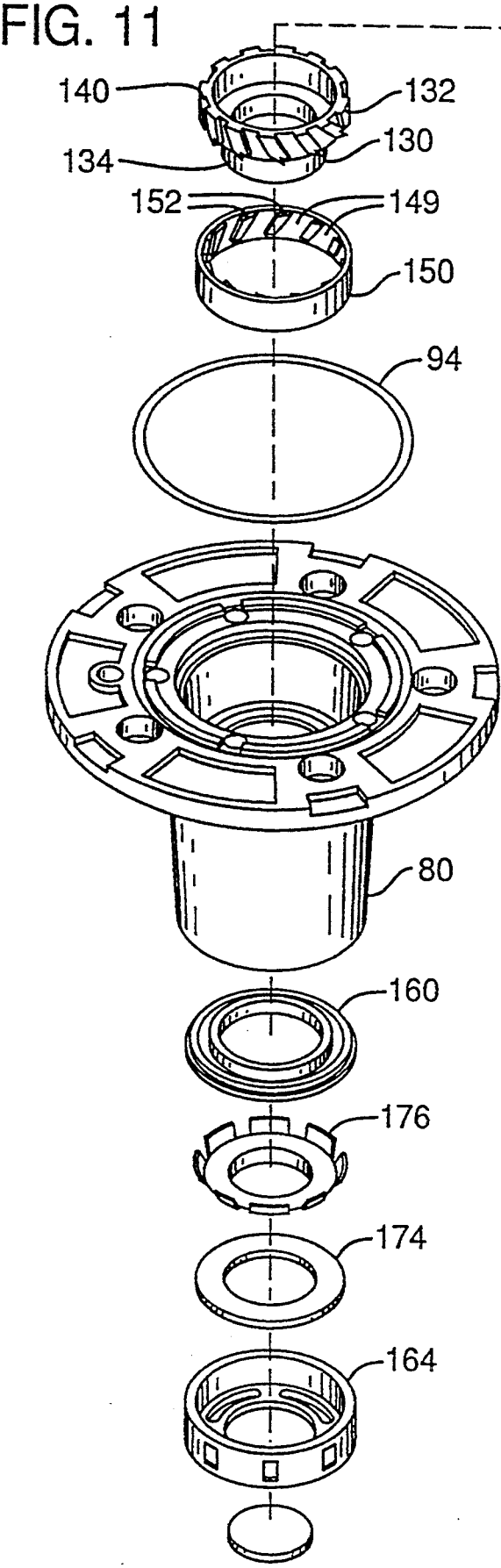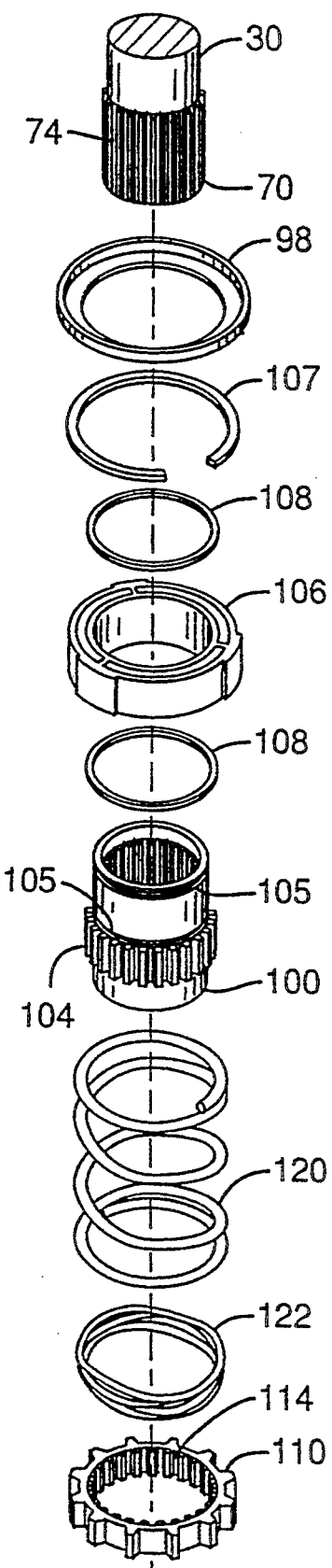

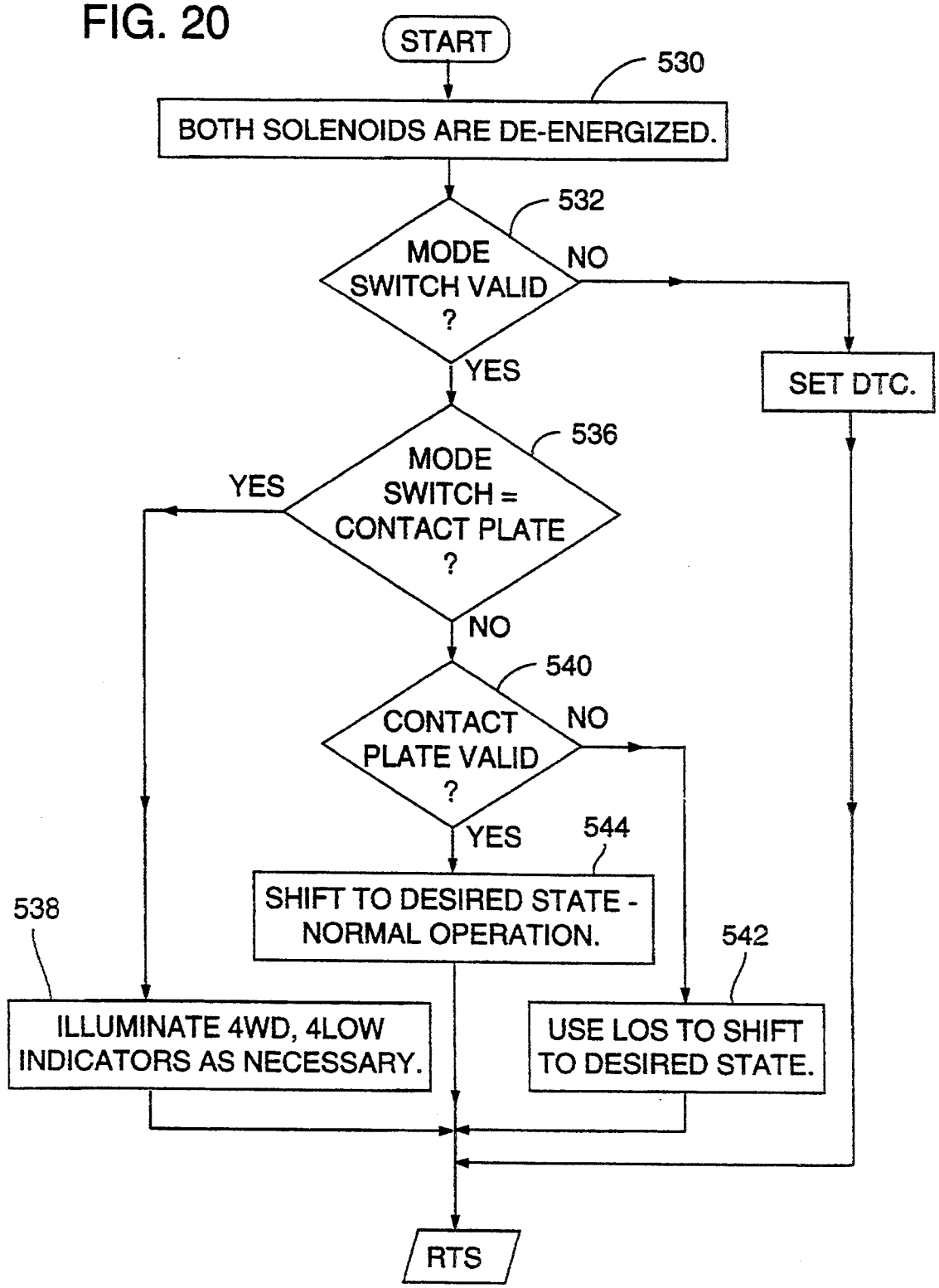

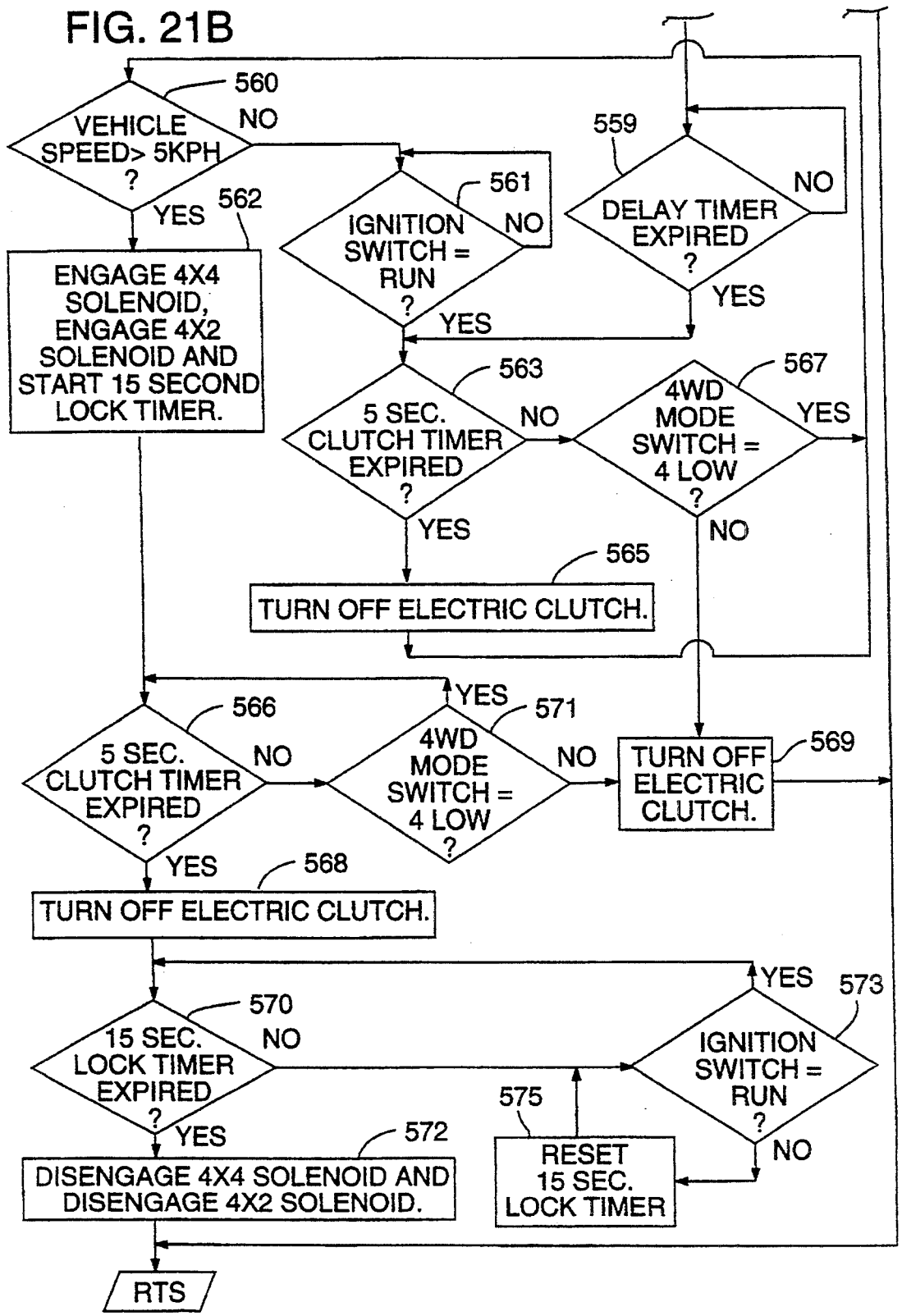

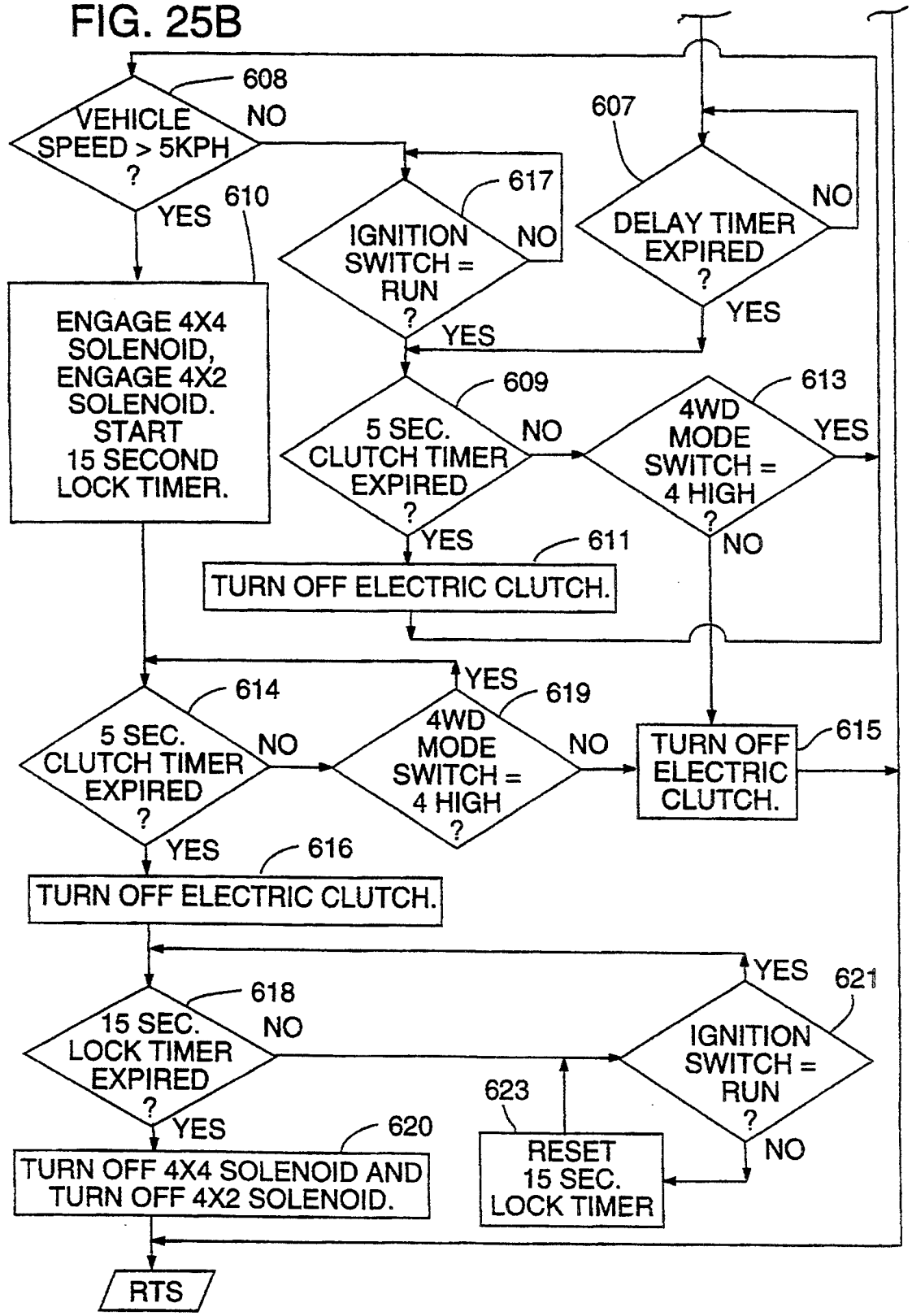

PULSE ACTUATED HUB LOCKS AND CONTROL ARRANGEMENT

RELATED APPLICATION

This application is related to U.S. Patent Application Ser. No. 08/143,086 entitled PULSE ACTUATED CLUTCH FOR VEHICLE DRIVE LINES filed Oct. 26, 1993 by Jon A. Bigley and Evan R. Baker.

FIELD OF THE INVENTION

This invention relates generally to clutching mechanisms for components of a drive train of a vehicle and particularly to a clutch mechanism actuated by a momentary biasing pulse.

BACKGROUND OF THE INVENTION

This invention may be applied to locking hubs (hub locks) for vehicles which convert between two-wheel drive and four-wheel drive operation. Typically such vehicles have two wheels, (e.g., the back wheels) that are permanently interconnected to the vehicle's drive line. The drive line also extends to the front two wheels but clutch mechanisms are provided for each of the front wheels that enable disconnecting and connecting each of the front wheels to a front drive axle of the drive line. Various types of control mechanisms are employed to actuate the clutch mechanisms. Typically the control mechanism of each wheel moves a clutch ring that will either become engaged with both the wheel hub and the drive axle or the clutch ring will be moved to be engaged with only one member, either the wheel hub or the drive axle. For purposes of discussion, the clutch ring will hereafter be referred to as permanently engaged with the wheel hub and is movable into engagement and out of engagement with the drive axle. The clutch rings of each front wheel when moved to be engaged with both the wheel hub and the drive axle provides for four wheel drive mode, that is the drive axles of the vehicle will drive all four wheels. The clutch rings of each wheel when moved to a position where they engage only the wheel hub disconnects the wheel hub from the drive axle and provides for two wheel drive mode.

The control mechanism can be manually actuated or automatically actuated. The automatic controls can be mechanically actuated (typically cam actuated) or pressure actuated (such as by positive or negative air pressure).

Pressure actuation has a number of advantages but also some serious disadvantages. The actuating mechanism is housed within the wheel hub. A piston is moved back and forth by changing the pressure relationship as between the two sides of the piston. The air pressure on one side has to be variable and, thus, requires an enclosure to create an air tight chamber that is connected to an air pressure source. The air pressure source is readily available on engine powered vehicles (e.g., negative air pressure is drawn to the manifold) but the air chamber encompasses moving parts that requires sealing. Several different seals are required for creating the air tight chamber within the wheel hub.

Typically the piston is biased to move in one direction to a first position by a spring. The application of air pressure opposes the spring pressure to move the piston in the opposite direction to a second position. The piston is maintained in the second position only so long as the air pressure is maintained at a level to overcome the spring. A leak in any one of the several seals can produce malfunction of the clutch. In addition to the possibility of malfunction due to seal leakage, the piston will not be maintained in the second position when the pressure is lost, such as by stopping the vehicle engine. The mechanism will have to be actuated again once the engine is restarted to move the piston to the second position.

SUMMARY OF THE INVENTION

A preferred embodiment of the present invention is an automatic clutch mechanism fitted in a wheel hub of a vehicle and an associated control mechanism. The clutch mechanism is characterized by operation in two states, i.e., engaged and disengaged, with transition between such states being accomplished by, in the preferred embodiment, application of given air pressure for a given period of time. The control mechanism, in the preferred embodiment of the present invention, controls the level and duration of each pulse of air pressure applied to affect the coupling and uncoupling of the clutch mechanism in coordination with other vehicle control procedures and in such manner to ensure the complete transition of the clutch mechanism from one mechanical state to the other mechanical state regardless of intervening conditions, including, for example, vehicle power off conditions and rapid cycling of an operator controlled mode switch.

Refer now to the drawings and the detailed description for a complete understanding of the invention.

BRIEF DESCRIPTION OF THE DRAWINGS

FIG. 7 is a flattened view of the cam members of the primary piston of FIG. 5;

FIG. 8 is a flattened view of the cams of the index ring of FIG. 6;

FIGS. 9A, 9B and 9C are flattened views showing the relation between cam members of the primary piston and index ring;

FIG. 10 is a sectional view as viewed on view lines 2—2 of FIG. 1 showing another embodiment of the pulse actuated clutch of the present invention;

FIG. 11 is an exploded view of the wheel hub and the pulse actuated clutch of FIG. 10;

FIG. 20 is a flow chart illustrating an initialization routine executed at the time of engine start-up.

FIGS. 21A and 21B, combined, illustrate a flow chart for control procedures executed when going from a two-wheel drive state to a four-wheel drive low range state.

FIGS. 25A and 25B, combined, show a flow chart for control procedures executed when moving from a two-wheel drive state to a four-wheel drive high range state.

DESCRIPTION OF THE PREFERRED EMBODIMENT

Figure 1:
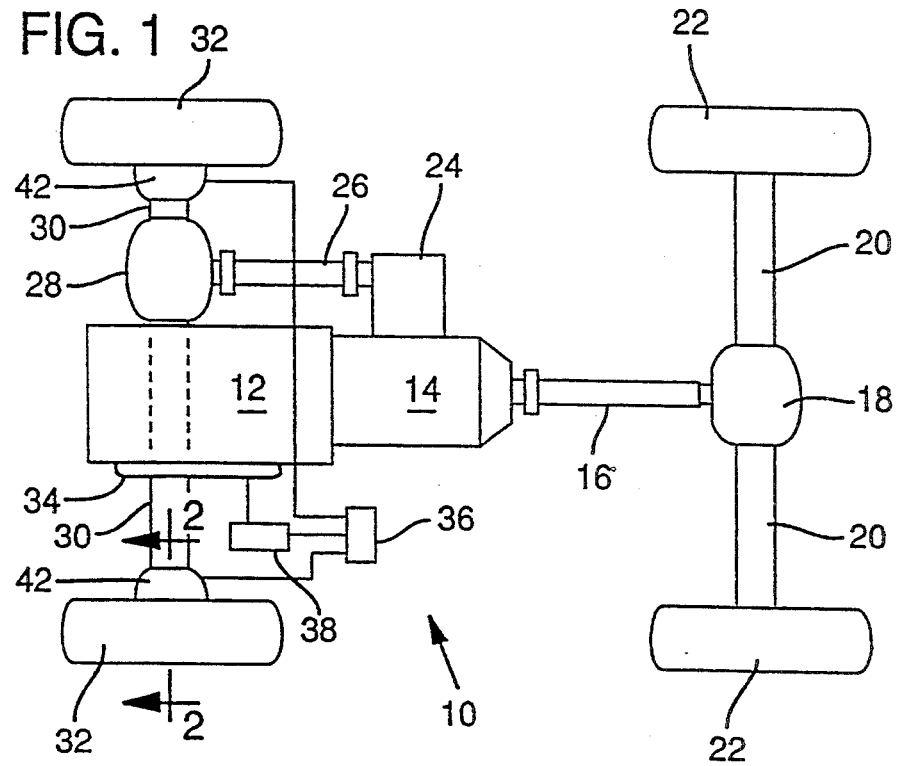
FIG. 1 is a schematic view of a four wheel drive vehicle incorporating the pulse actuated clutch of the present invention.

Refer now to FIG. 1 of the drawings which schematically illustrates a vehicle 10. The vehicle 10 may be driven in two wheel or four wheel drive mode. The vehicle 10 has an engine 12 coupled to a transmission 14. A rear drive shaft 16 extending from the transmission 14 is connected to a rear differential 18. Rear axles 20 extend from the differential 18 to provide rotative power to the rear wheels 22. The transmission 14 includes a transfer case 24. A front drive shaft 26 extending from the transfer case 24 is connected to a front differential 28. Front axles 30 extend from the front differential to provide rotative power to the front wheels 32. The transfer case 24 includes conventional shift mechanism to either provide rotative power to the front drive shaft 26 for four wheel drive mode or not to provide rotative power to the front drive shaft for two wheel drive mode.

The engine 12 has an intake manifold 34 as a source for negative air pressure for the operation of the pulse actuated clutch mechanism which will be later described. A control 36 is provided for controlling the flow of air to and from the clutch mechanisms. A reservoir 38 is coupled to the intake manifold 34.

The front wheels 32 include end hubs 280 which are later described and illustrated. The end hubs 280, which will hereafter be referred to as hubs 280, house the pulse actuated clutch mechanism of the present invention. The pulse actuated clutch mechanism couples and uncouples the wheels 32 to the front drive axles 30. When the vehicle 10 is operated in the two wheel drive mode, i.e., with the shift mechanism of the transfer case 24 in its disconnected position, the wheels 32 are uncoupled from the front drive axles 30 so that the front wheels will not propel the front axles 30 and the drive shaft 26. When the vehicle 10 is driven in four wheel drive mode, i.e., with the shift mechanism of the transfer case 24 in its connected position, the wheels 32 are then coupled to the front axles 30 so that power will be transmitted to the front wheels. Front steering knuckles 42 are provided to facilitate steering the vehicle 10.

Figure 1A:
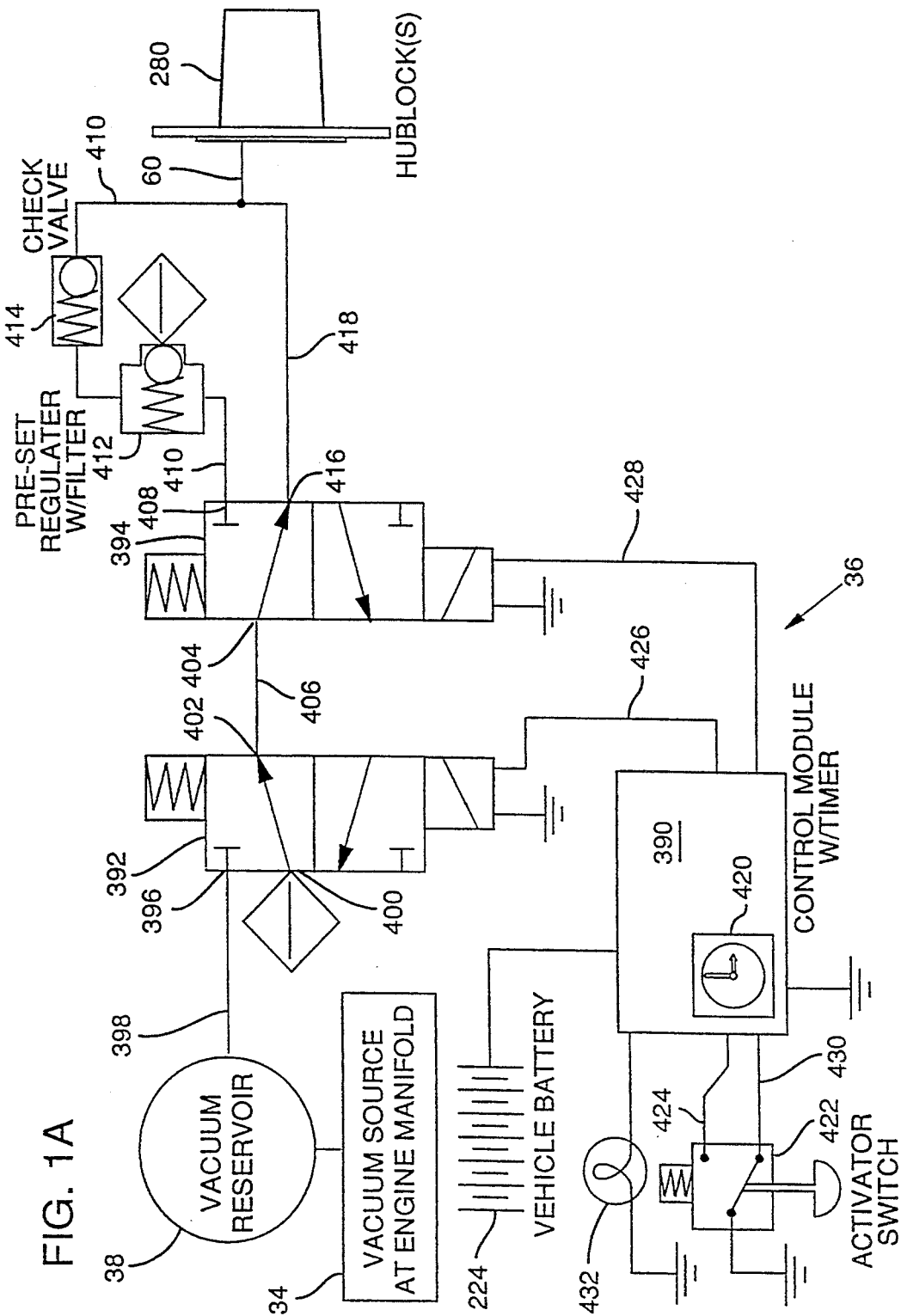
FIG. 1A is a diagrammatical view of a control for controlling the actuation of the pulse actuated clutch of the present invention.
Figure 2:
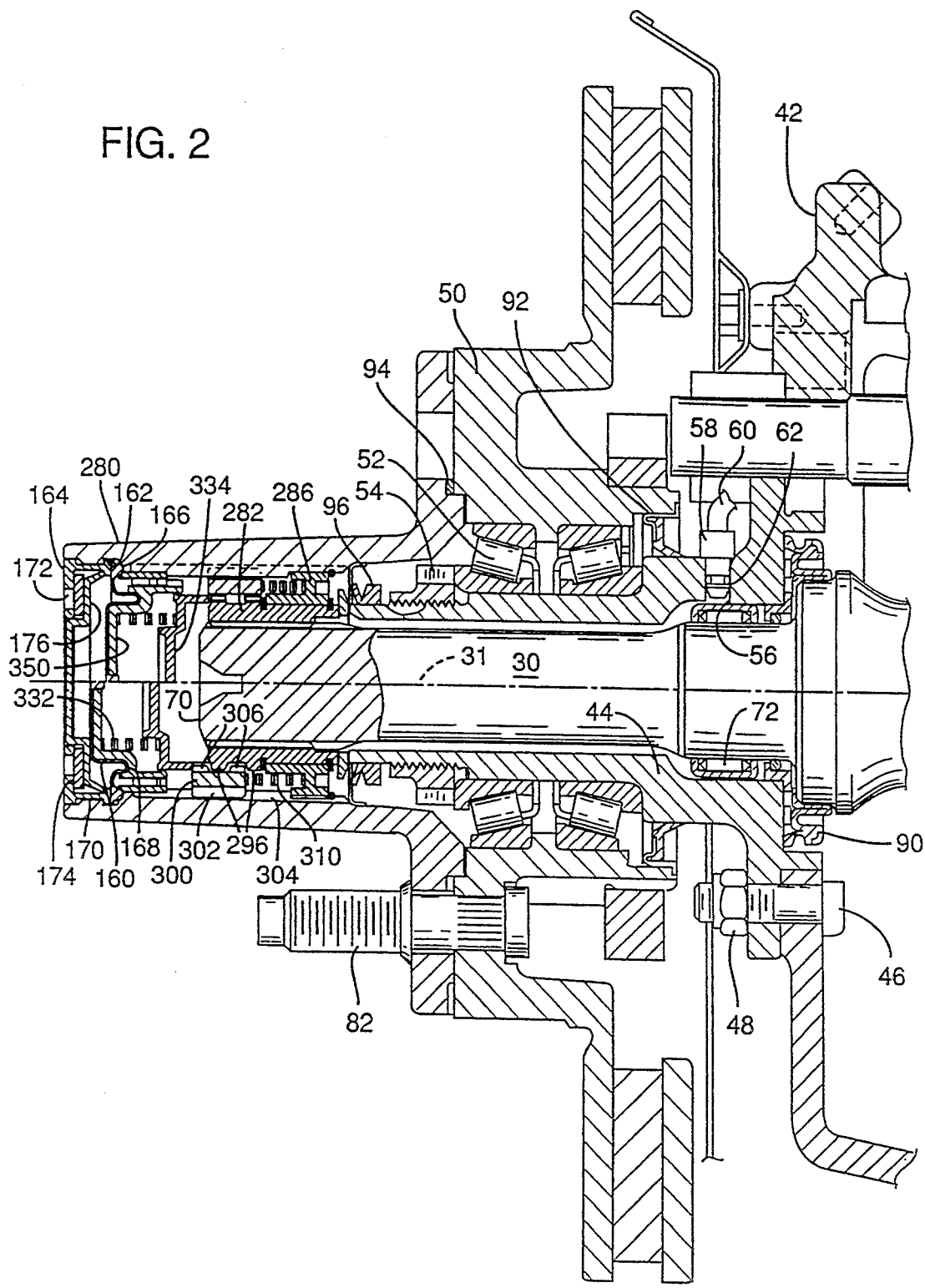
FIG. 2 is a sectional view as viewed on view lines 2—2 of FIG. 1 showing one embodiment of the pulse actuated clutch of the present invention.

Refer now to FIG. 2 of the drawings which shows in sectional view a portion of the front drive train including the front drive axle, the wheel hubs, the pulse actuated clutch mechanism of the present invention and the mounting arrangement for the front wheel. A spindle 44 is fixedly mounted to the knuckle 42 by bolts 46 and nuts 48. An integral wheel hub and brake rotor 50 is rotatably mounted on the spindle 44 by bearings 52. The integral wheel hub and brake rotor 50 is retained on the spindle by retaining nut 54. A bore 56 is provided in the spindle 44 for receiving a bushing 58 of an air line 60. The bushing 58 is sealed against leakage by an o-ring seal 62. The air line extends through the knuckle 42 and is coupled to the control 36 (see FIGS. 1 and 1A). The axle 30 is received in the spindle 44 with an end 70 of the axle 30 extending beyond the end of the spindle. The axle 30 is rotatively supported in the spindle 44 on bearing 72. An end hub 280 is mounted to the integral wheel hub and brake rotor 50 on bolts 82. The wheel 32 is mounted on the bolts 82 in a conventional manner (wheel not shown in FIG. 2).

The present invention utilizes air pressure to activate a clutch mechanism housed within the hub 280 to couple and uncouple the drive axle 30 to the hub 280 and the integral wheel hub and rotor 50 on which the wheel 32 is mounted. This requires an air tight chamber and seals are thus provided. A seal 90 seals the axle 30 to the spindle 44, a wheel hub seal 92 seals the wheel hub 50 to the spindle 44, a seal 94 seals the hub 280 to the wheel hub 50 and a seal 96 seals the hub 280 to the spindle 44. A seal flange 98 is provided in the hub 280 to facilitate sealing the hub 80 to the spindle 44 by seal 96. The end of the hub 280 is sealed by a diaphragm 160 fitted in the end of the hub 280.

Figure 3:
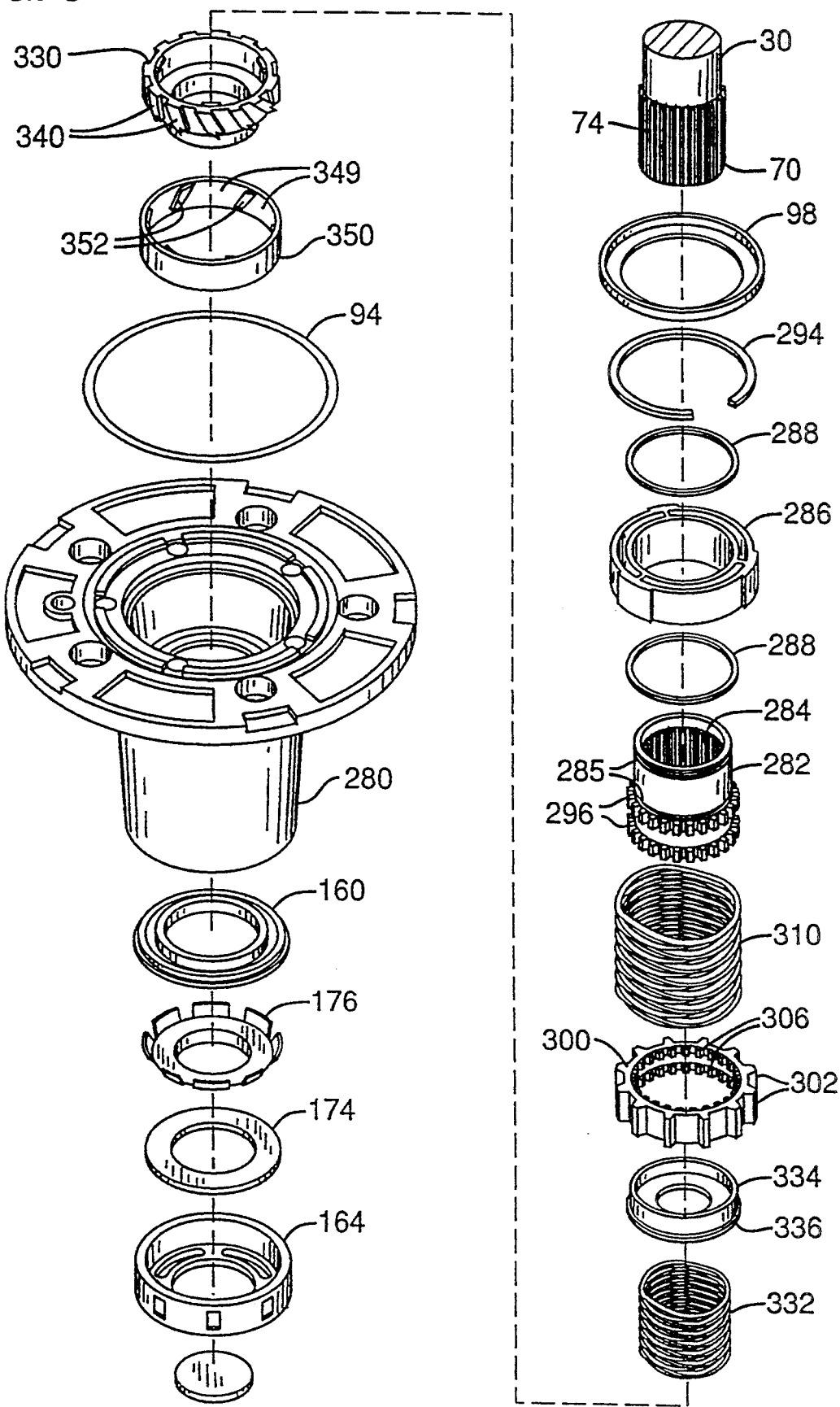
FIG. 3 is an exploded view of the wheel hub and the pulse actuated clutch of FIG. 2.
Figure 4A:
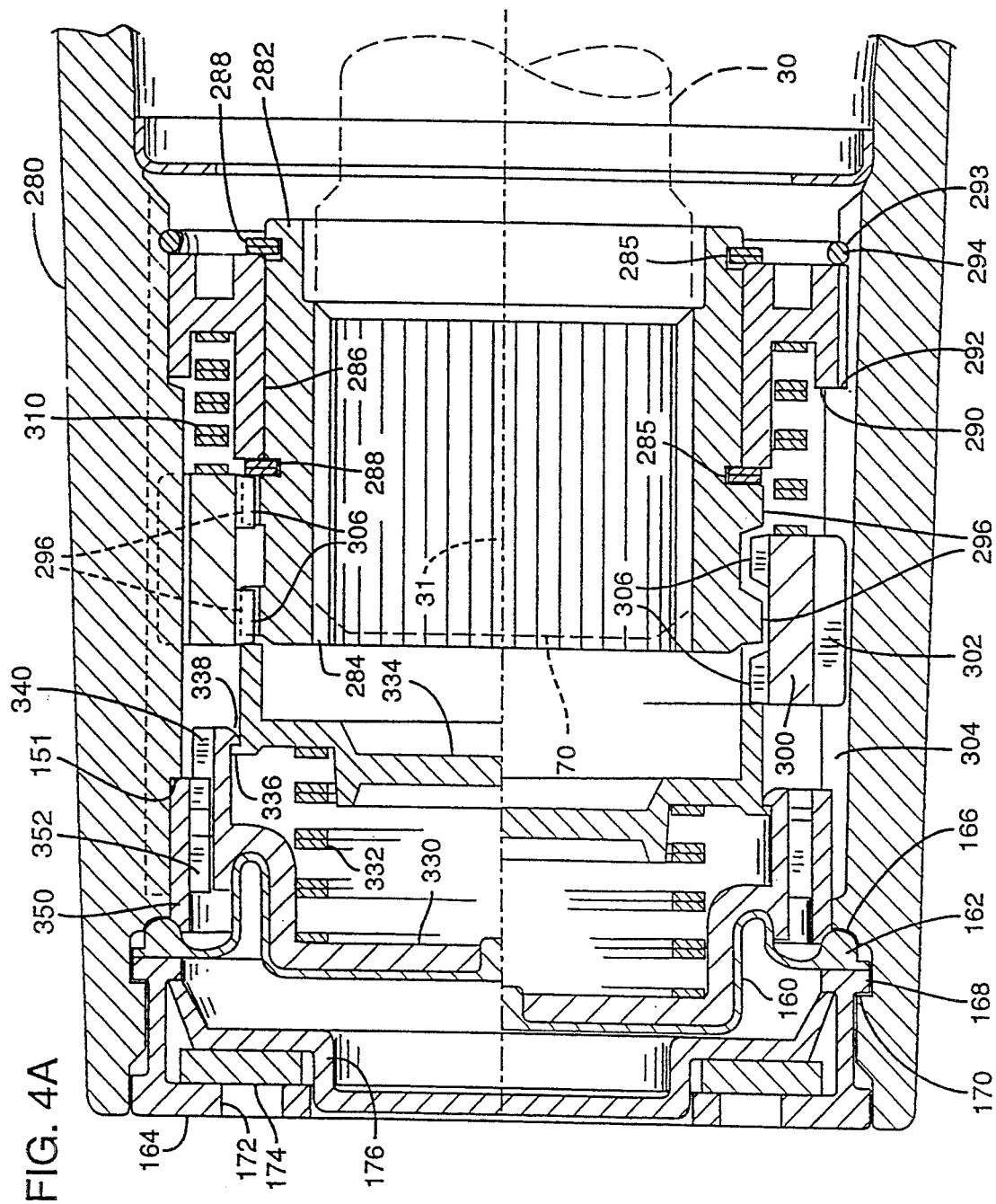
FIGS. 4A, 4B and 4C are enlarged partial sectional views of the wheel hub end of FIG. 2.

As was previously mentioned, a clutch mechanism is housed within the hub 280 to couple and uncouple the drive axle 30 to the hub 280 and accordingly to the integral wheel hub and rotor 50. Refer also to FIGS. 3 and 4A of the drawings which provide further detail of the clutch mechanism of the present invention. FIG. 3 is an exploded view showing the relation of the hub 280 and its components and FIG. 4A is an enlarged sectional view of a portion of the hub 280. The clutch mechanism includes an inner gear 282 received on the end 70 of the axle 30. As shown in FIGS. 2 and 4A, the end 70 of the axle 30 extends into the housing of the hub 280. The end 70 has splines 74 (see FIG. 3) that mate with internal splines 284 of the inner gear 282. A bushing 286 rotatably supports the inner gear 282 and thus the end 70 of the axle 30 in the hub 280. The bushing is retained on the inner gear by retainers (fasteners), such as snap rings 288 and has an outer end 290 retained in abutment with a shoulder 292 in the hub 280 by another retainer (fastener) fitting in a groove 293, such as snap ring 294. Following assembly, the inner gear 282 in effect becomes a part of the axle 30.

A coupling member such as a clutch ring 300 surrounds the inner gear 282 and is in splined engagement with the hub 280. The clutch ring 300 has external splines 302 in sliding engagement with internal splines 304 of the hub 280. The clutch ring 300 is slidably movable along the splines 304 of the hub 280 in a first direction to a first position where it is out of engagement with the inner gear (as shown in the lower half of FIG. 4A) and in a second direction to a second position where internal splines 306 of the clutch ring 300 matingly engage external splines 296 of the inner gear 282 (as shown in the upper half of FIG. 4A). As shown in FIGS. 2, 3 and 4A, the clutch ring 300 has double rows of internal splines 306 that matingly engage double rows of external splines 296 on the inner gear 300. The clutch ring 300 is urged out of engagement with the inner gear 282 by a yieldable biasing member such as a wave spring 310. The ends of the spring 310 are in abutment with the clutch ring 300 and the bushing 286.. The clutch ring 300 is urged into engagement with the inner gear 282 by the impulse actuated clutch mechanism of the present invention, which will now be described.

Figure 16:
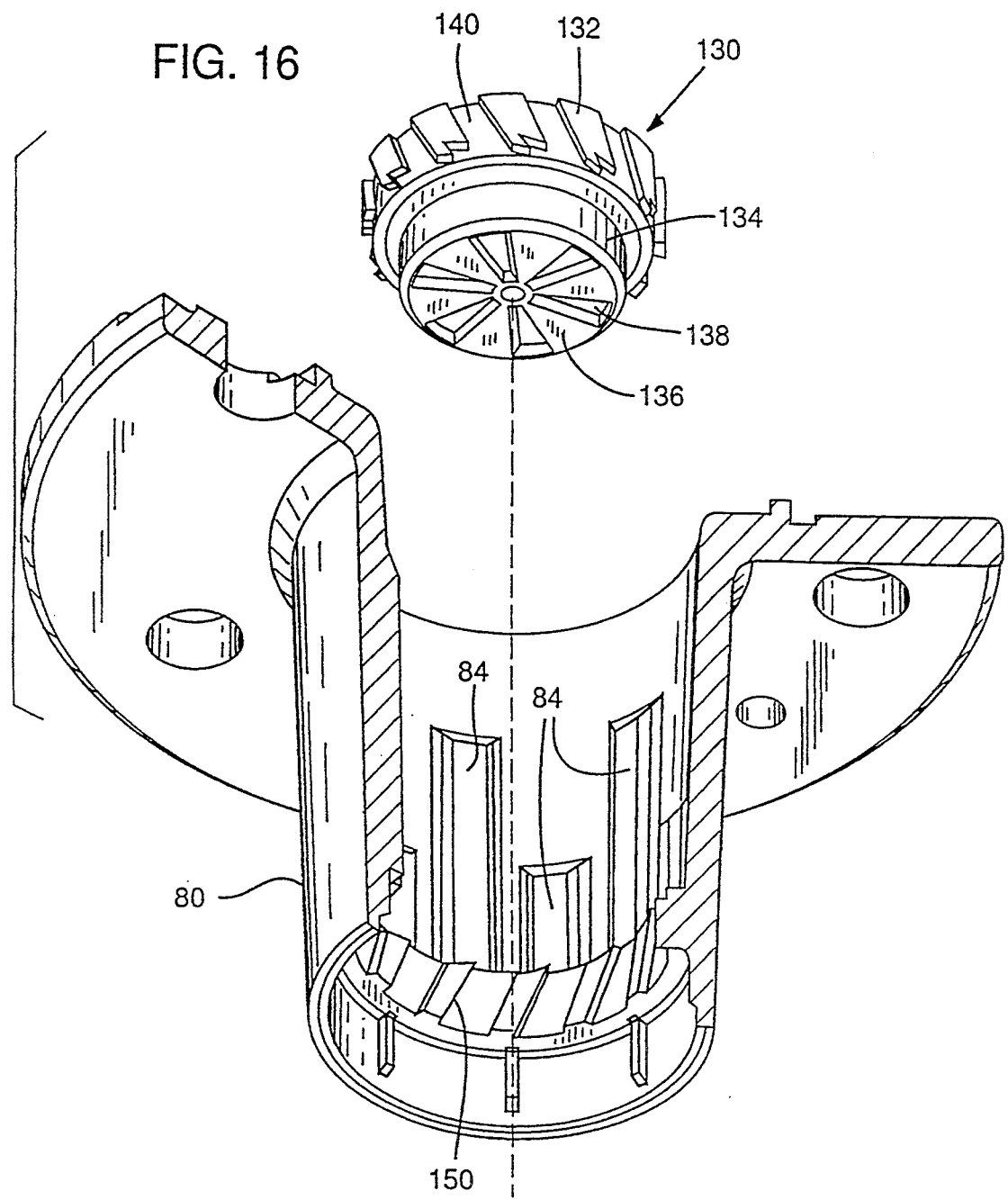
FIG. 16 is an cut-away view of an alternate hub having cam members integrally formed thereon and a piston of the pulse actuated clutch; and, FIG 17 is a diagrammatical view of an alternate control for controlling the actuation of the pulse actuated clutch of the present invention.

Still referring to FIG. 4A in conjunction with FIGS. 2 and 3, a movable piston assembly is in abutment with the clutch ring 300 on the side opposite the spring 310. The movable piston assembly has a primary piston 330 that receives a wave spring 332 and a secondary piston 334. The secondary piston 334 is slidably movable in the primary piston 330 and is biased to move in the primary piston by the wave spring 332. An extending lip 336 (see FIG. 4A) on the secondary piston 334 engages a shoulder 338 of the primary piston 330 to limit the travel of the secondary piston urged by the spring 332. The primary piston 330 has multiple formations such as helical cams 340 (best seen in FIG. 5) in cooperative engagement with multiple formations such as helical cams 352 (best seen in FIG. 6) of an index ring 350 which will be further described and illustrated later. The index ring 350 is secured in position against a shoulder 151 of the hub 280 in a conventional manner such as by press fitting the index ring 350 in the hub 280. The index ring 350 may be provided as a separate item as illustrated in FIGS. 2, 3, 4A and 6 or the cam surfaces 352 may be formed integral with the hub 280 in the manner as illustrated in FIG. 16. A diaphragm 160 of resilient elastomeric material is loosely fitted to the piston 330. The peripheral edge 162 of the diaphragm 160 is secured between an end cap 164 fitted to the end of the hub 280 and a formed shoulder 166 of the hub 280. The diaphragm 160, as previously mentioned seals the end of the hub 280. The end cap 164 is secured to the end of the hub 280 by formed latches 168 of the cap engaging raised detents 170 of the hub 280. The end cap 164 has apertures 172 to permit entry and exit of air into the cavity between the end cap 164 and the diaphragm 160.

A filter 174 covers the apertures 172 and is held in position by retainer 176. The wheel hub and rotor 50, the end hub 280, the axle 30, the inner gear 282, the clutch ring 300, the piston 330 and the index ring 350 all have a common axis of rotation designated by the numeral 31.

Refer to FIG. 3 of the drawings. The inner gear 282 has inner splines 284 that will mate with the external splines 74 on the end 70 of the axle 30. Two rows of external splines 296 formed on the inner gear 282 will mate with the two rows of internal splines 306 of the clutch ring 300. Grooves 285 are provided on the inner gear 282 for receiving the snap rings 288. The clutch ring 300 has external splines 302 that will slidingly engage the splines 304 of the hub 280.

Figure 5:
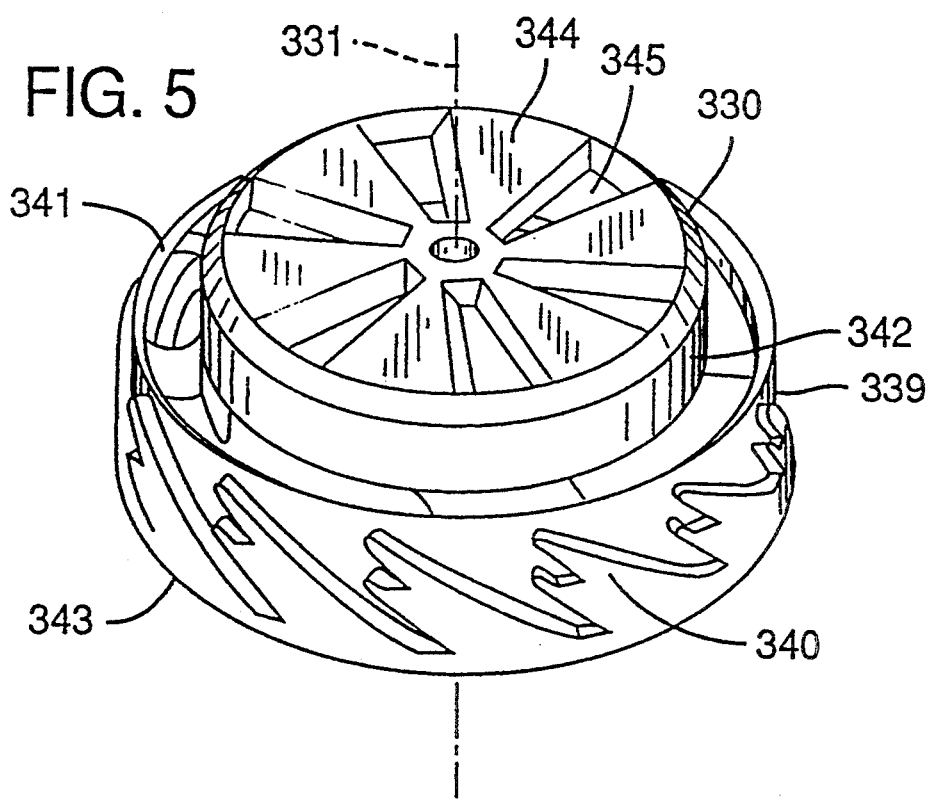
FIG. 5 is a view of a primary piston of the pulse actuated clutch of the present invention.

The piston 330, which is further illustrated in FIG. 5 is a shaped member that has two cylindrical portions of differing diameters that have a common longitudinal axis 331. The cylindrical portion having the smaller diameter will be referred to as the cup 342. The cup 342 has an end 344 and apertures 345 are formed in the end 344. The larger cylindrical portion will be referred to as the cam section 339. Multiple helical cam members 340 are formed and positioned in a spaced relation on the periphery of the cylindrical cam section 339 between the cylindrical ends 341 and 343. The cams 340 are positioned such that the edges of the cams 340 are at an angle to the longitudinal axis 331 and to the cylindrical ends 341 and 343 of the cam section 339. As seen in FIG. 7, which show the cam members in flattened detail, the cam members 340 have a leading edge 346, a formed notch 347 and a trailing edge 348. As shown in FIGS. 5 and 7, the leading edge 346 and the trailing edge 348 are inclined at an angle with respect to the axis 331 and the cylindrical ends 341 and 343. The leading edge 346 and the notch 347 in combination define a first step and the trailing edge 348 and the notch 347 in combination define a second step.

Figure 6:
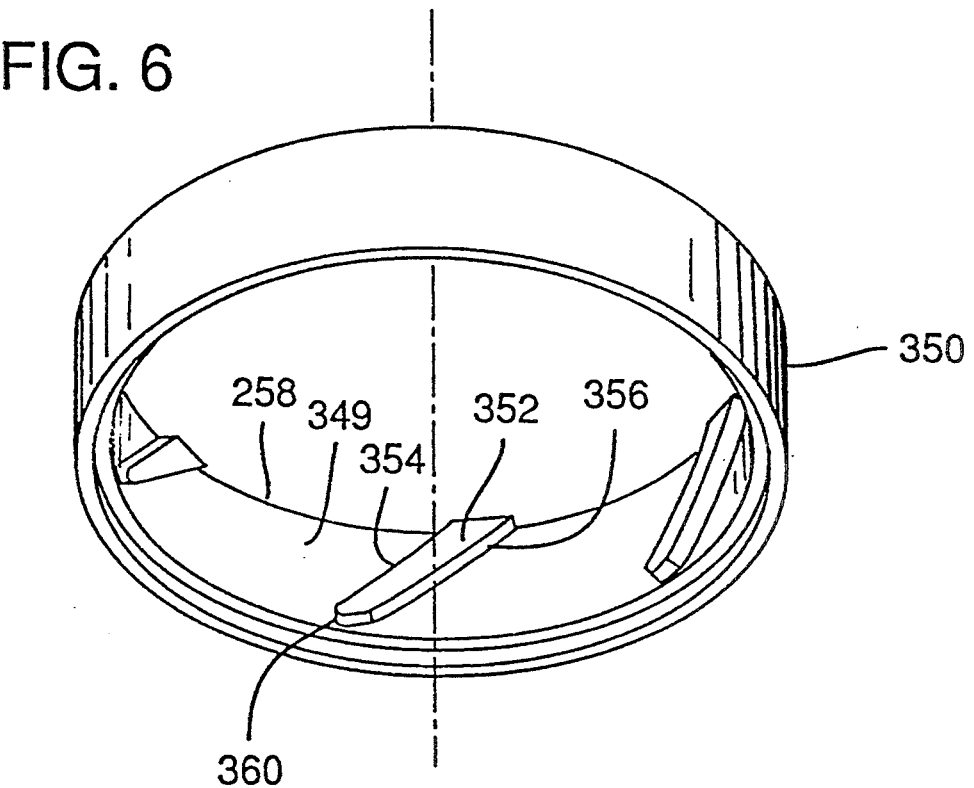
FIG. 6 is a view of an index ring of the pulse actuated clutch of the present invention.

The index ring 350 as best seen in FIGS. 3 and 6 is a ring shaped cylindrical member having raised cam members 352 on its interior surface 349. Refer also to FIG. 8 which shows the cams 352 in flattened detail. As shown, the cams 352 have a leading edge 354 and a trailing edge 356 extending from end 358 of the ring 350 with the leading edge and the trailing edge cooperatively forming an end 360 on the cam member 352.

Refer once again to FIGS. 2 and 4A. The clutch ring 300 is movable to a first position to be out of engagement with the inner gear 282 as shown in the lower half of FIGS. 2 and 4A and to a second position where the clutch ring 300 is in engagement with the inner gear 282 as shown in the upper half of FIGS. 2 and 4A. The clutch ring 300 moved to the first position (out of engagement with the inner gear 282) provides for independent rotation of the wheel 32 and the axle 30. The clutch ring 300 moved to the second position (into engagement with the inner gear 282) locks the rotation of the wheel 32 to the rotation of the axle 30 to provide unity of rotation.

Referring again to FIG. 4A, the clutch ring 300 is urged to move out of engagement (the first position) with the inner gear by the return spring 310. The return spring 310 is captive between the clutch ring 300 and the bushing 286 and applies a biasing force against the clutch ring to urge it out of engagement. The lower half of FIG. 4A shows the clutch ring 300 out of engagement with the inner gear 282. This as previously mentioned, permits independent rotation of the wheel 32 and the axle 30. The clutch ring 300 is forced to move into engagement (the second position) by movement of the piston assembly toward the second position. The secondary piston 334 is in abutment with the clutch ring 300 on the side opposite the return spring 310. A selectively controlled pulse of negative air pressure, that is, a partial vacuum is created within the defined air tight chamber provided by the sealing members previously described. Air is withdrawn (evacuated) from the chamber which applies a force to the diaphragm 160. The diaphragm 160 fitted to the primary piston 330 forces the piston assembly to move toward the second position. The secondary piston 334 of the piston assembly is in abutment with the clutch ring 300 and movement of the piston assembly urges the clutch ring 300 to move into engagement with the inner gear 282. The upper half of FIG. 4A shows the piston assembly and the clutch ring 300 moved to the second position with the double row of splines 306 of the clutch ring 300 in engagement with the double row of splines 296 on the inner gear 282.

The cam members 340 of the primary piston 330 are in mesh with cam members 352 of the index ring 350 with a cam member 352 received between adjacent cam members 340. It will be appreciated that reference will be made to the index ring throughout for discussion and illustrative purposes, however the cam members 352 may be formed integral with the hub 280 as previously mentioned. FIGS. 9A, 9B and 9C show the cam members 340 and 352 in flattened detail and show the relative position of the cam members.

Consider first the condition where the clutch ring 300 is out of engagement with the inner gear 282 as shown in the lower half of FIG. 4A. Pressure is equalized on both sides of the diaphragm 160 and the return spring 310 maintains the clutch ring 300 and the piston assembly in the first position, that is the clutch ring 300 and the inner gear 282 are out of engagement. The position of the cam members 340 and 352 are as illustrated in FIG. 9A.

Differential air pressure is utilized to affect movement of the piston assembly and the clutch ring 300 from the out of engagement position (first position) to the engaged position (second position). In this embodiment, negative air pressure is utilized. Air is withdrawn (evacuated) from the defined chamber which applies a force against the diaphragm 160. As air is withdrawn, the differential air pressure will cause the diaphragm 160 to grip the cup portion 342 of the primary piston 330. The force applied to the diaphragm 160 and thus to the primary piston 330 will urge the piston assembly and the clutch ring 300 to move axially toward the second position. As the piston assembly and the clutch ring 300 move to the second position, the compression spring 310 will be compressed, the clutch ring 300 will come into engagement with the inner gear 282 and into abutment with the retainer 288. The force applied by the negative air pressure is sufficient to force further movement of the primary piston 330 to partially compress the spring 332. As the primary piston 330 is moved axially along the rotational axis 31 as indicated by arrow 370 in FIG. 9A, the leading edge 346 of the cam member 340 will be in sliding engagement with the leading edge 354 of the cam member 352. During movement of the primary piston 330 in the direction indicated by arrow 370, the cam members 340 and 352 will cooperatively rotate the primary piston 330 within the hub 280 about the rotation axis 31 as indicated by arrow 372. The rotation of the piston 330 will twist the diaphragm 160 gripping the cup 342 of the piston to provide a resistive biasing torque on the piston 330. The diaphragm 160 can be considered to be a loadable biasing member, that is it does not provide any rotational biasing force until it is twisted. As the primary piston 330 continues to move in the direction indicated by arrow 370, the end 360 of the cam member 352 will clear the leading edge 346 of the cam member 340. The biasing force provided by the twisted diaphragm 160 will cause the primary piston 330 to rotate counter to the direction indicated by arrow 372 which will place the end 360 of the cam member 352 in the notch 347 of the cam member 340. The negative air pressure in the defined chamber is released and the partially compressed spring 332 will urge the primary piston to move toward the first position to fully seat the end 360 in the notch 347 as shown in FIG. 9B. The first pulse of negative air pressure is selected to have a magnitude sufficient to only move the primary piston 330 a sufficient distance to have the end 360 of the cam member 352 seated in the notch 347 of the cam member 340. The end 360 seated in the notch 347 prevents the springs 310 and 332 from moving the clutch ring 300 and the piston assembly to the out of engagement position (first position). The clutch mechanism is thus in a latched position when the end 360 is seated in the notch 347. Referring to the upper half of FIG. 4A, the clutch mechanism in the latched condition has the clutch ring 300 moved into engagement with the inner gear 282. The condition of the upper half of FIG. 4A is when the splines of the inner gear 282 and the clutch ring 300 are in alignment.

Frequently, the splines of the clutch ring 300 and the inner gear 282 are out of alignment and when the clutch ring is urged to move into engagement, the splines 306 of the clutch ring abut the splines 296 of the inner gear. This condition is illustrated in the upper half of FIG. 4B. As shown, the primary piston 330 has been moved by the application of negative air pressure and is in the latched condition. The clutch ring 300 is prevented from moving into engagement, since the splines 306 are not aligned with the splines 296 of the inner gear 282 and thus the secondary piston 334 which is in abutment with the clutch ring is prevented from moving. As the primary piston 330 moved, the wave spring 332 in abutment with the primary piston 330 and the secondary piston 334 is compressed. Upon rotation of the hub and axle relative to one another, the splines 306 of the clutch ring 300 and the splines 296 of the inner gear 282 become aligned and the clutch ring is forced into engagement by the force applied by the compressed spring 332. When the clutch ring 300 becomes engaged with the inner gear 282, the clutch ring and piston assembly will be positioned as shown in FIG. 4A.

The clutch mechanism is unlatched to permit movement of the clutch ring 300 toward the first position and out of engagement with the inner gear 282 by applying a second pulse of negative air pressure to the defined chamber. The second pulse of negative air pressure is greater in magnitude than the first pulse. As shown in the upper half of FIG. 4C, the second pulse of pressure moves the primary piston toward the clutch ring to further compress the wave spring 332 between the primary piston 330 and the secondary piston 334. As the primary piston 330 is moved, the leading edge 354 of the cam member 352 will be in sliding contact with the side of the notch 347 to once again rotate the primary piston 330 to twist the diaphragm 160. The primary piston 330 is moved to the position shown in FIG. 4C which moves the cam member 340 clear of the end 360 of cam member 352. The diaphragm 160 will rotate the primary piston 330 sufficiently to move the tip of the notch 347 adjacent the trailing edge 348 past the end 360 of cam member 352. The air pressure is released and the return springs 332 and 310 will force the piston assembly and the clutch ring toward the first position as indicated by arrow 380 in the lower half of FIG. 4C. The release of the pressure releases the grip that the diaphragm 160 has on the primary piston 330 and as the primary piston 330 is moved toward the first position, the cam members 340 and 352 will be in sliding engagement as shown in FIG. 9C.

Figure 4B:
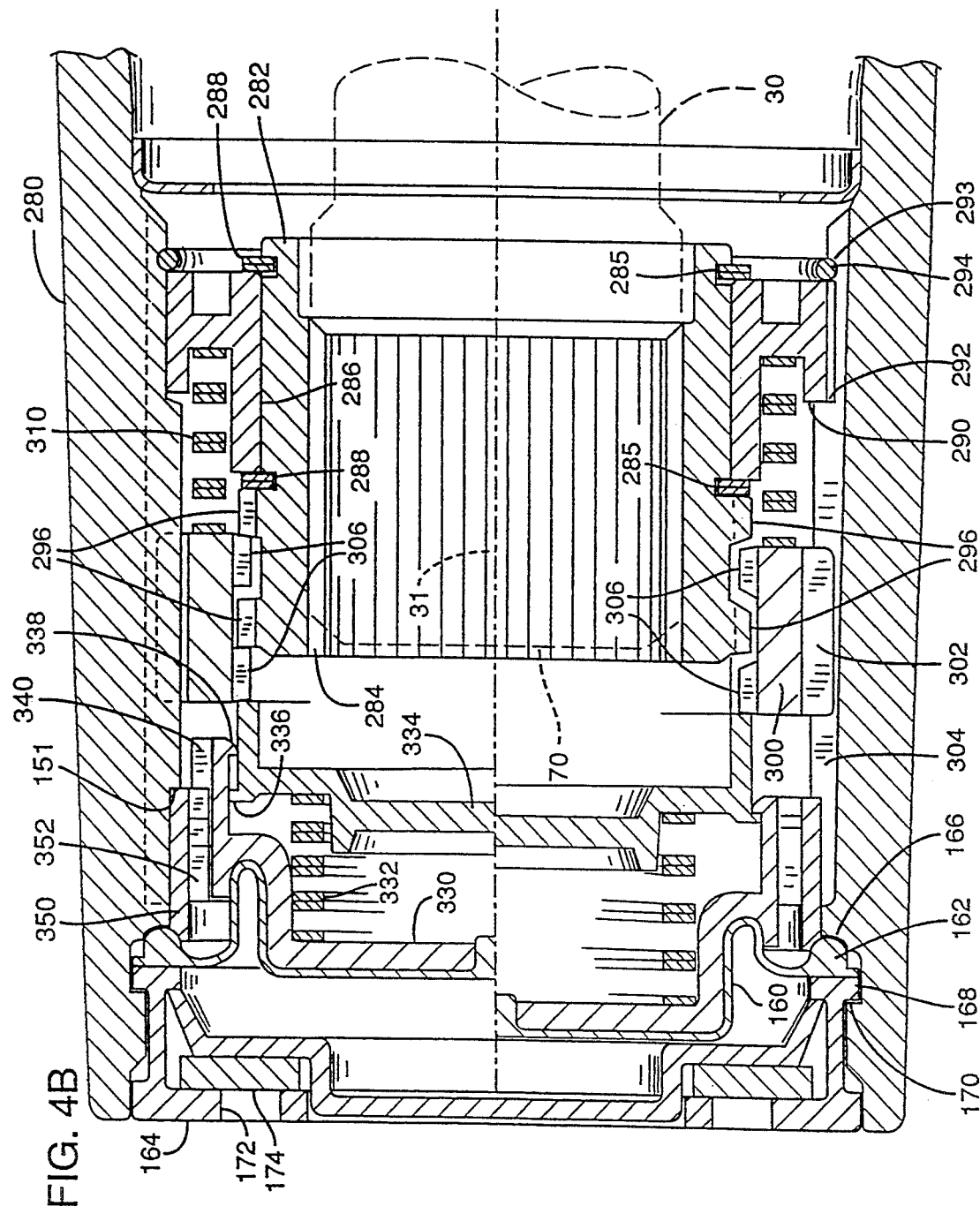
Figure 4C:
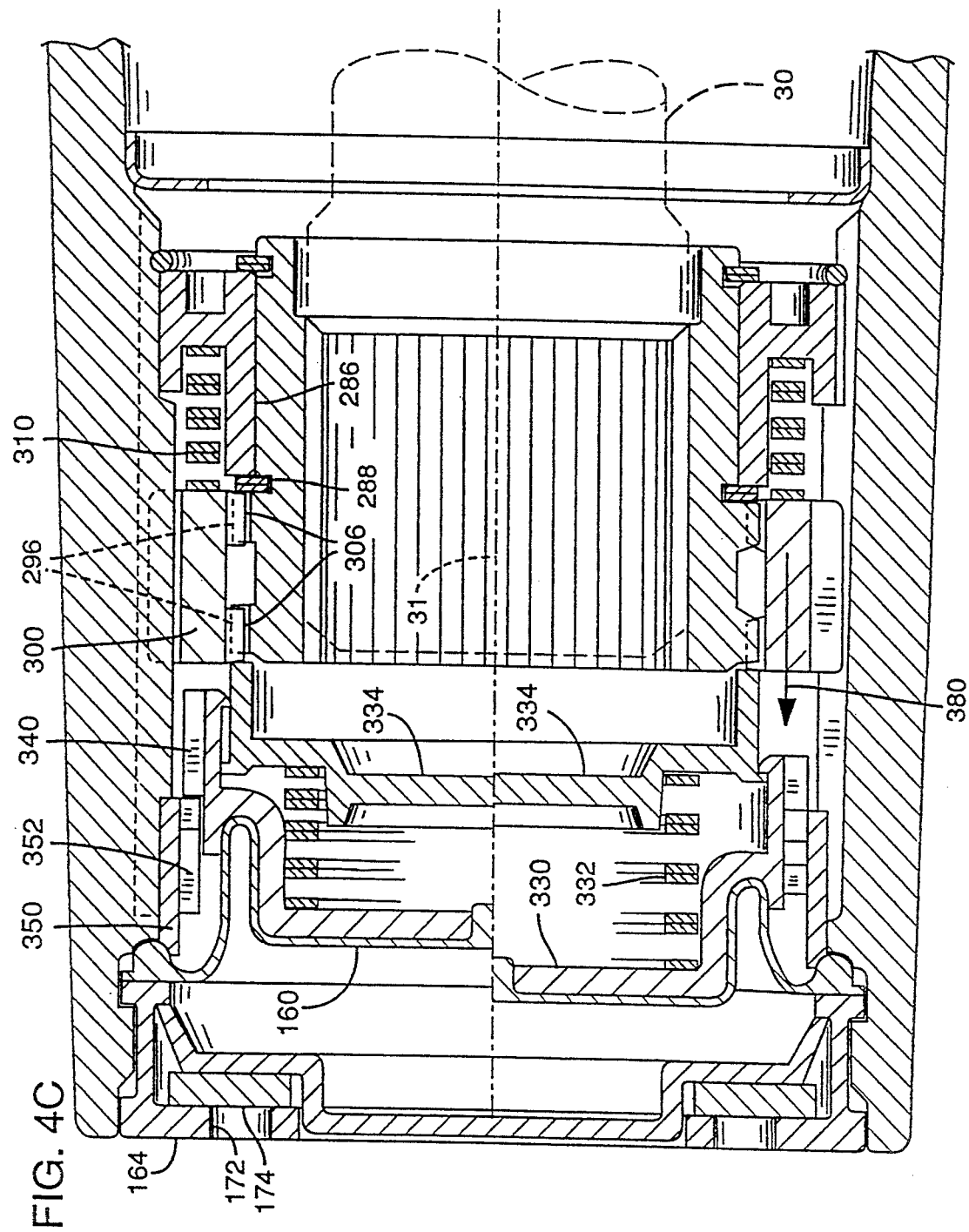

Refer again to the upper half of FIG. 4B where the splines of the clutch ring 300 and the inner gear 282 are in abutment. The first pulse of negative air pressure is selected to have a magnitude to force axial movement of the primary piston 330 adequately to latch the clutch mechanism in the engaged position. That is, the primary piston 330 will be forced to move axially toward the inner gear 282 and will be moved far enough for the leading edge 346 of the cam member 340 to clear the end 360 of the cam member 352 (see FIGS. 9A and 9B). The spring 332, which opposes the force applied by the negative air pressure, will be compressed in the process since the secondary piston 334 in abutment with the clutch ring 300 is prevented from movement. The spring 332 as it is compressed, provides a linearly increasing counter force to oppose the force provided by the negative air pressure. The spring 332 is selected to provide a counter force upon compression of the spring 332 to a determined distance to equalize the force applied by the first pulse of negative air pressure. The spring 332 will thus limit the movement of the primary piston relative to the secondary piston to a predetermined distance. As by way of example and still referring to the condition where the splines of the clutch ring 300 are in abutment with the splines of the inner gear 282, a first pulse of negative air pressure on the order of eight inches of mercury will move the primary piston 330 axially relative to the index ring 350 and thus relative to the secondary piston 334 on the order of 0.170 inches. In the example illustrated in the upper half of FIG. 4B, the primary piston 330 will be moved 0.170 inches upon the application of a first pulse of negative air pressure of eight inches of mercury. The 0.170 inch movement of the primary piston will move the tip of the leading edge 346 of the cam member 340 beyond the end 360 of the cam member 352 permitting the primary piston to rotate to receive the end 360 in the notch 347. Upon release of the first pulse of negative air pressure, the compressed spring 332 will force the primary piston toward the first position to fully seat the end 360 in the notch 347. When the axle 30 and the hub 280 are rotated relative to each other, the splines 296, 306 of the inner gear 282 and the clutch ring 300 will become aligned and the compressed spring 332 will force the clutch ring to snap into engagement with the inner gear 282. The primary piston 330 is prevented from moving toward the first position by the end 360 seated in the notch 347. The compressed spring 332 will force the secondary piston 334 to move axially to the second position and thus move the clutch ring 300 to move axially to the second position to become engaged with the inner gear 282 as illustrated in the upper half of FIG. 4A.

The primary piston 330 is moved axially relative to the index ring 350 and since the secondary piston 334 is prevented from further movement also moves relative to the secondary piston 334 a greater distance to unlatch the clutch mechanism and in this embodiment the distance is on the order of 0.210 inches. Referring to the upper half of FIG. 4A, the clutch ring 300 is engaged with the inner gear 282 and the primary piston 330 is in a latched position, that is the end 360 of the cam member 352 is seated in the notch 347 of the cam member 340. A second pulse of negative air pressure is applied and in this embodiment, the second pulse has a minimum magnitude on the order of ten inches of mercury. The application of the second pulse will force the primary piston 330 to move axially toward the inner gear 282 and thus move relative to the index ring 350 and the secondary piston 334. The secondary piston 334 is prevented from moving by the clutch ring 300 in abutment with retainer 288. The second pulse of negative air pressure will force the primary piston 330 to move sufficiently for the end 360 of the cam member 352 to clear the tip of the notch 347 adjacent the trailing edge 348 of the cam member 340 (see FIGS. 9A,B,C). The twisted diaphragm 160 will rotate the primary piston 330 and upon release of the second pulse of negative air pressure, the compressed springs 332 and 310 in combination will force the primary piston 330 toward the first position and move the clutch ring 300 and the piston assembly to the first position to thus move the clutch ring 300 out of engagement with the inner gear 282.

In the situation where the splines of the clutch ring 300 and the inner gear 282 are aligned, the application of the first pulse of negative air pressure will initially move the piston assembly (i.e., the primary piston 330, spring 332 and secondary piston 334) and the clutch ring 300 axially to the second position with the clutch ring 300 engaging the inner gear 282. In this embodiment, the initial movement of the clutch ring 300 to engage the inner gear 282 and come into abutment with the retainer 288 is on the order of 0.125 inches. This initial movement is not sufficient for the end 360 to clear the end of the notch 347 adjacent the leading edge 346. The first pulse of negative air pressure will continue to move the primary piston 330 beyond the initial movement an additional 0.170 inches, again compressing the spring 332. The additional 0.170 inch movement of the primary piston 330 moves the end of the notch 347 adjacent the leading edge 346 clear of the end 360 and the piston will be rotated to receive the end 360 in the notch 347. The combined movements of the initial movement to engagement (0.125) plus the additional movement (0.170) will not move the primary piston far enough for the end 360 to clear the end of the notch 347 adjacent the trailing edge 348 and therefore as the piston is rotated, the end 360 will still be received in the notch 347. The first pulse of negative air pressure is released and the end 360 becomes fully seated in the notch 347 to latch the clutch mechanism.

Refer now to FIG. 1A of the drawings which diagrammatically illustrates the control 36 for controlling the application and release of the first and second pulse of negative air pressure to and from the hubs 280. A control module 390 is provided to control two three-way, two-position, solenoid-actuated, spring-return pneumatic valves 392 and 394. A port 396 of valve 392 is connected to the reservoir 38 via air line 398. Port 400 of valve 392 is vented to the atmosphere. Port 402 of valve 392 is connected to port 404 of valve 394 via air line 406. Port 408 of valve 394 is connected to a regulator 412 via an air line 410. The regulator 412 is connected to air line 60 of the hub 280 via a check valve 414. Port 416 of valve 394 is connected to the air line 60 via air line 418. The control module 390 controls the operation of the valves 392 and 394 by energizing and de-energizing the circuits to the valves. A timer 420 is provided in the control module 390 to control the length of time a circuit is to be energized. An activator switch 422 is provided to enable the control module 390. FIG. 1A shows the condition where the circuits are not energized and the valves 392 and 394 are in their normal position. To engage the clutch ring 300 with the inner gear 282, the switch 422 is toggled to complete the circuit to the control module 390 via line 424. This will set the timer 420 and energize the valves 392 and 394 via lines 426 and 428. Valve 392 will connect port 396 to port 402 and valve 394 will connect port 404 to port 408. Air will thus be withdrawn from the defined chamber of the hub 280. The regulator 412 is set so that a partial vacuum of a magnitude of about eight inches of mercury will be created in the defined cavity of the hub 280. This will latch the clutch mechanism as previously described. After the timer cycles, the valves 392 and 394 will be de-energized to return to their normal state and the defined cavity of the hub 280 will be vented to the atmosphere via lines 60, 418 and through the valves 392 and 394. To move the clutch ring 300 out of engagement with the inner gear 282, the switch 422 is toggled to complete the circuit to the control module 390 via line 430. This will set the timer 420 for the proper interval for disengaging and will energize the valve 392 via line 426. Valve 394 is not energized and remains in its normal position. Port 396 is once again connected to port 402 of valve 392 and air is withdrawn from the defined cavity of the hub 280 via line 418 and 60. After the timer cycles, the valve 392 is de-energized and the cavity is once more vented to the atmosphere. The control module 390 and the valves 392 and 394 are powered by the vehicle battery 224. An indicator light 432 is provided to indicate that the hubs have been engaged.

An alternate embodiment of the pulse actuated clutch mechanism will now be described.

The front wheels 32 include end hubs 80 which are later described and illustrated. The end hubs 80, which will hereafter be referred to as hubs 80, house the impulse actuated clutch mechanism of the present invention. The impulse actuated clutch mechanism couples and uncouples the wheels 32 to the front drive axles 30. When the vehicle 10 is operated in the two wheel drive mode, i.e., with the shift mechanism of the transfer case 24 in its disconnected position, the wheels 32 are uncoupled from the front drive axles 30 so that the front wheels will not propel the front axles 30 and the drive shaft 26. When the vehicle 10 is driven in four wheel drive mode, i.e., with the shift mechanism of the transfer case 24 in its connected position, the wheels 32 are then coupled to the front axles 30 so that power will be transmitted to the front wheels. Front steering knuckles 42 are provided to facilitate steering the vehicle 10.

Refer now to FIG. 10 of the drawings which shows in sectional view a portion of the front drive train including the front drive axle, the wheel hubs, the impulse actuated clutch mechanism of the present invention and the mounting arrangement for the front wheel. A spindle 44 is fixedly mounted to the knuckle 42 by bolts 46 and nuts 48. An integral wheel hub and brake rotor 50 is rotatably mounted on the spindle 44 by bearings 52. The integral wheel hub and brake rotor 50 is retained on the spindle by retaining nut 54. A bore 56 is provided in the spindle 44 for receiving a bushing 58 of an air line 60. The bushing 58 is sealed against leakage by an o-ring seal 62. The air line extends through the knuckle 42 and is coupled to the control 36 (see FIG. 1). The axle 30 is received in the spindle 44 with an end 70 of the axle 30 extending beyond the end of the spindle. The axle 30 is rotatively supported in the spindle 44 on bearing 72. An end hub 80 is mounted to the integral wheel hub and brake rotor 50 on bolts 82. The wheel 32 is mounted on the bolts 82 in a conventional manner (wheel not shown in FIG. 10).

The present invention utilizes air pressure to activate a clutch mechanism housed within the hub 80 to couple and uncouple the drive axle 30 to the hub 80 and the integral wheel hub and rotor 50 on which the wheel 32 is mounted. This requires an air tight chamber and seals are thus provided. A seal 90 seals the axle 30 to the spindle 44, a wheel hub seal 92 seals the wheel hub 50 to the spindle 44, a seal 94 seals the hub 80 to the wheel hub 50 and a seal 96 seals the hub 80 to the spindle 44. A seal flange 98 is provided in the hub 80 to facilitate sealing the hub 80 to the spindle 44 by seal 96. The end of the hub 80 is sealed by a diaphragm 160 fitted in the end of the hub 80.

Figure 12:
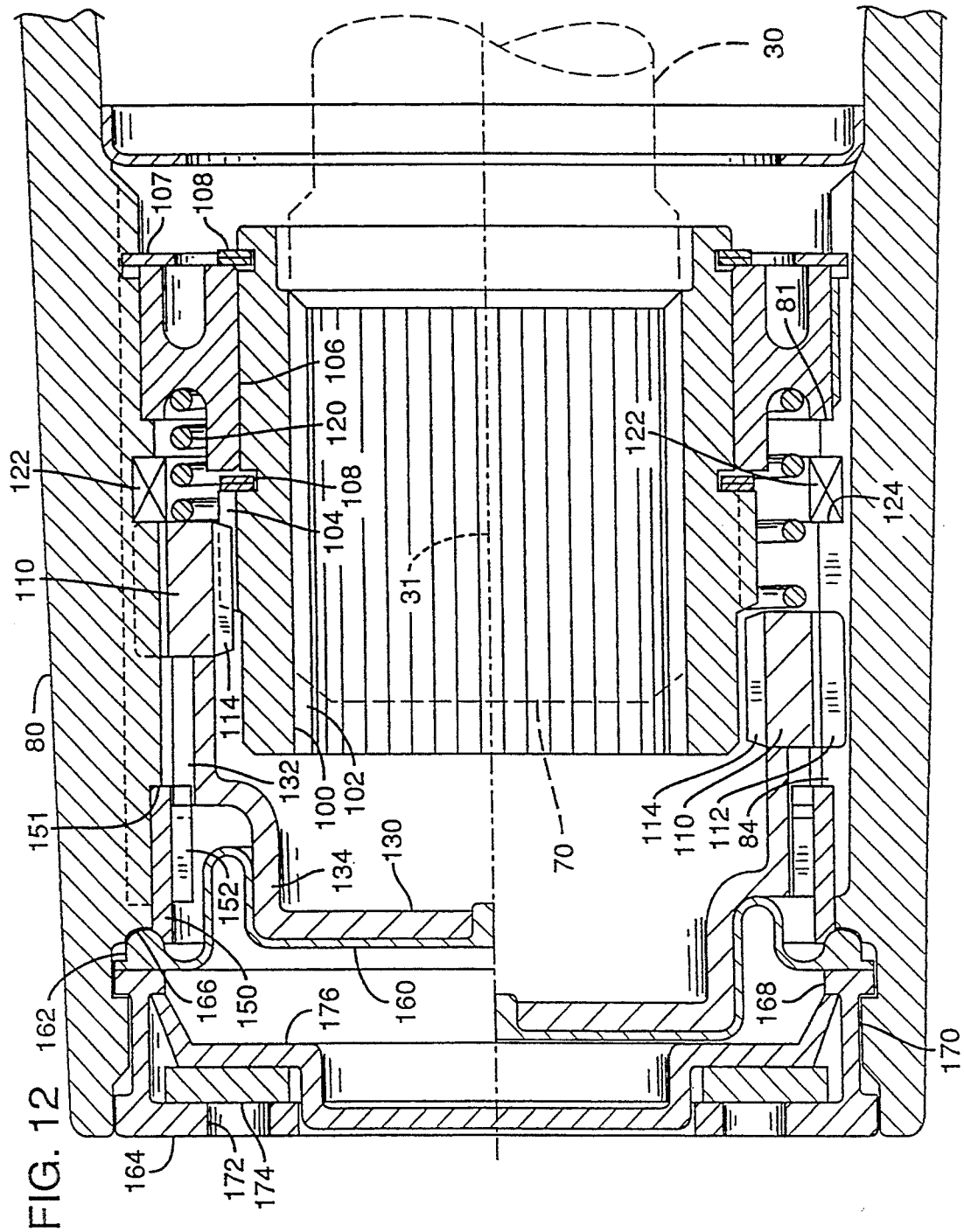
FIG. 12 is an enlarged partial sectional views of the wheel hub end of FIG. 10.

As was previously mentioned, a clutch mechanism is housed within the hub 80 to couple and uncouple the drive axle 30 to the hub 80 and accordingly to the integral wheel hub and rotor 50. Refer also to FIGS. 11 and 12 of the drawings which provide further detail of the clutch mechanism of the present invention. FIG. 11 is an exploded view showing the relation of the hub 80 and its components and FIG. 12 is an enlarged sectional view of a portion of the hub 80. The clutch mechanism includes an inner gear 100 received on the end 70 of the axle 30. As shown in FIGS. 10 and 12, the end 70 of the axle 30 extends into the housing of the hub 80. The end 70 has splines 74 that mate with internal splines 102 of the inner gear 100. A bushing 106 rotatably supports the inner gear 100 and thus the end 70 of the axle 30 in the hub 80. The bushing is retained on the inner gear by fasteners, such as snap rings 108 and is retained in abutment with a shoulder 81 in the hub 80 by another fastener, such as snap ring 107. Gear 100 is thus a permanent fixture of axle 30 following assembly.

A coupling member such as a clutch ring 110 surrounds the inner gear 100 and is in splined engagement with the hub 80. The clutch ring 110 has external splines 112 in sliding engagement with internal splines 84 of the hub 80. The clutch ring 110 is slidably movable along the splines 84 of the hub 80 in a first direction to a first position where it is out of engagement with the inner gear (as shown in the lower half of FIG. 12) and in a second direction to a second position where internal splines 114 of the clutch ring 110 matingly engage external splines 104 of the inner gear 100 (shown in the upper half of FIG. 12). The clutch ring 110 is urged out of engagement with the inner gear 100 by a yieldable biasing member such as a spring 120. The ends of the spring 120 are in abutment with the clutch ring 110 and the bushing 106. A wave spring 122 fitting in a groove 124 of the hub 80 is provided as an added (second) yieldable biasing member, the purpose of which will be later described. The clutch ring 110 is urged into engagement with the inner gear 100 by the impulse actuated mechanism of the present invention, which will now be described.

Referring to FIG. 12 in conjunction with FIGS. 10 and 11, a moveable piston 130 is in abutment with the clutch ring 110 on the side opposite the spring 120. The piston has multiple formations such as helical cams 132 in cooperative engagement with multiple formations such as helical cams 152 of an index ring 150. The index ring 150 is secured in position against a shoulder 151 of the hub 80 as by gluing. The index ring 150 may be provided as a separate item as illustrated in FIGS. 10, 11, and 12 or it may be formed integral with the hub 80 as illustrated in FIG. 16. A diaphragm 160 of resilient elastomeric material is loosely fitted to the piston 130. The peripheral edge 162 of the diaphragm 160 is secured between an end cap 164 fitted to the end of the hub 80 and a formed shoulder 166 of the hub 80. The diaphragm 160, as previously mentioned seals the end of the hub 80. The end cap 164 is secured to the end of the hub 80 by formed latches 168 of the cap engaging raised detents 170 of the hub 80. The end cap 164 has apertures 172 to permit entry and exit of air into the cavity between the end cap 164 and the diaphragm 160. A filter 174 covers the apertures 172 and is held in position by retainer 176. The wheel hub and rotor 50, the end hub 80, the axle 30, the inner gear 100, the clutch ring 110, the piston 130 and the index ring 150 all have a common axis of rotation designated by the numeral 31.

Refer to FIG. 11 of the drawings. The inner gear 100 has inner splines 102 that will mate with the external splines 74 on the end 70 of the axle 30. External splines 104 are formed on the inner gear that will mate with the internal splines 114 of the clutch ring 110. Grooves 105 are provided on the inner gear 100 for receiving the snap rings 108. The clutch ring 110 has external splines 112 that will slidingly engage the splines 84 of the hub 80. Internal splines 114 of the clutch ring 110 will mate with the external splines 104 of the inner gear 100.

Figure 13:
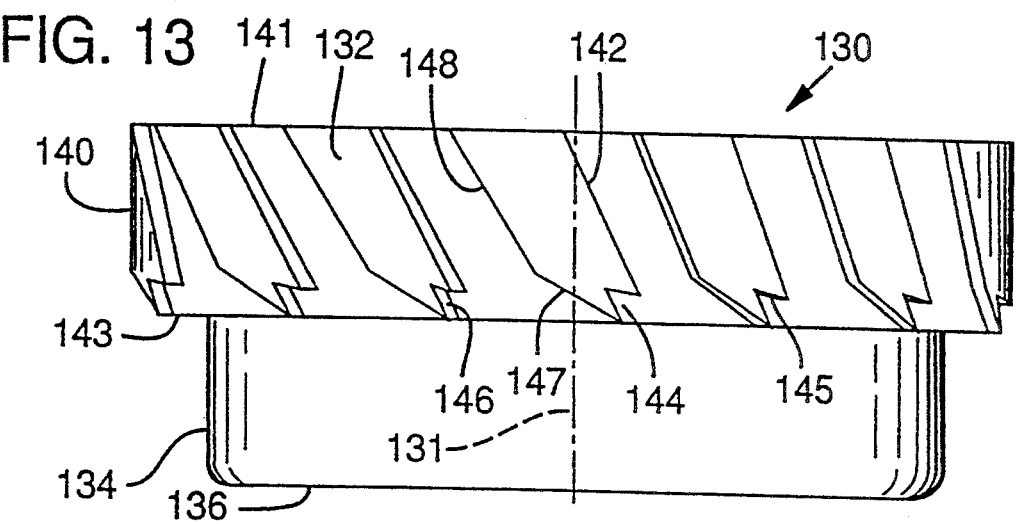
FIG. 13 is a view of an alternate piston of the pulse actuated clutch of FIG. 10.
Figure 13A:
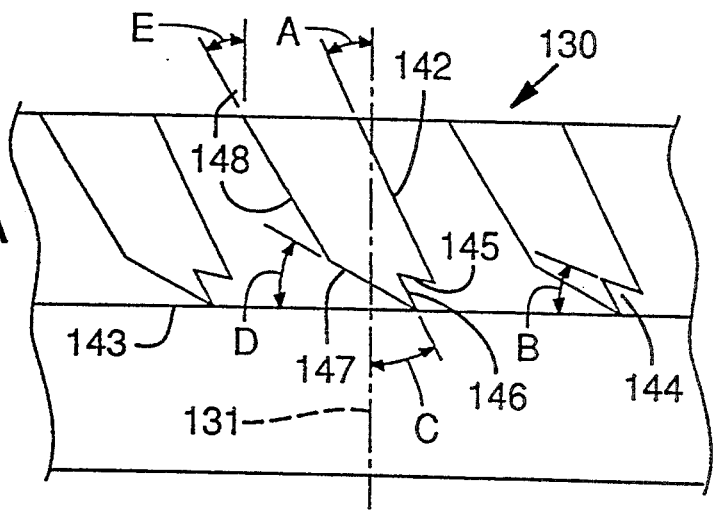
FIG. 13A is a flattened view of the cams of the piston of FIG. 13.

The piston 130, which is further illustrated in FIG. 13 is a shaped member that has two cylindrical portions of differing diameters that have a common longitudinal axis 131. The cylindrical portion having the smaller diameter will be referred to as the cup 134. The cup 134 has an end 136 (see FIG. 16) and apertures 138 are formed in the end 136. The larger cylindrical portion will be referred to as the cam section 140. Multiple helical cams 132 are formed and positioned in a spaced relation on the periphery of the cylindrical cam section 140 between the cylindrical ends 141 and 143. The cams 132 are positioned such that the edges of the cams 132 are at an angle to the longitudinal axis 131 and to the cylindrical ends 141 and 143 of the cam section 140. As seen in FIG. 13A, which show the cams in flattened detail, the cams 132 have a leading edge 142 that is at an angle A (the angle A being about 22 degrees) with respect to the axis 131. The leading edge 142 extends from the end 141 to a position near end 143 of the cam section 140 where it is joined to an edge 145 to form a first step. Edge 145 is one of the edges of a notch 144. The edge 145 is at an angle B (angle B being about 19 degrees) with respect to the end 143 of the cam section 140 and has its opposite end joined to an end of the other edge 146 of the notch 144. Edge 46 is in turn joined to a landing edge 147 at the end 143 of the cam section 140 to form a second step with the edge 146 at an angle C with respect to the axis 131 (the angle C being about 30 degrees). The notch 144 having edges 145 and 146 is thus formed between the leading edge 142 and the landing edge 147. The landing edge 147 is at an angle D (the angle D being about 30 degrees) with respect to the end 143 and extends from the end 143 of the cam section 140 to the trailing edge 148. The trailing edge 148 extends from the landing edge 147 to the end 141 of the cam section 140 and is at an angle E with respect to the axis 131 (the angle E being about 30 degrees).

Figure 14:
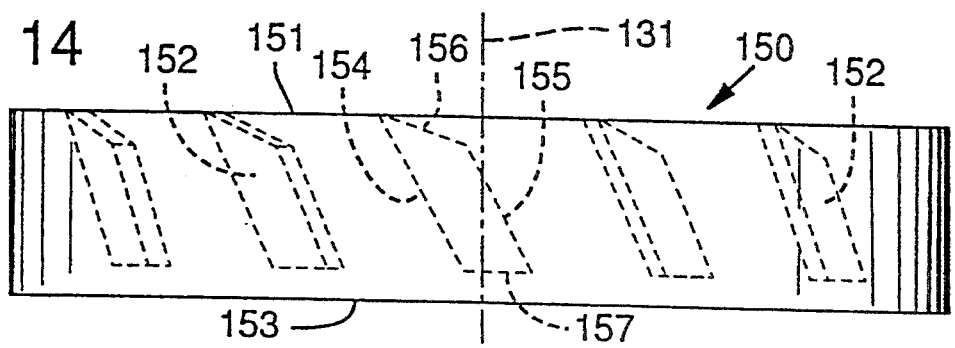
FIG. 14 is a view of an alternate index ring of the pulse actuated clutch of FIG. 10.
Figure 14A:
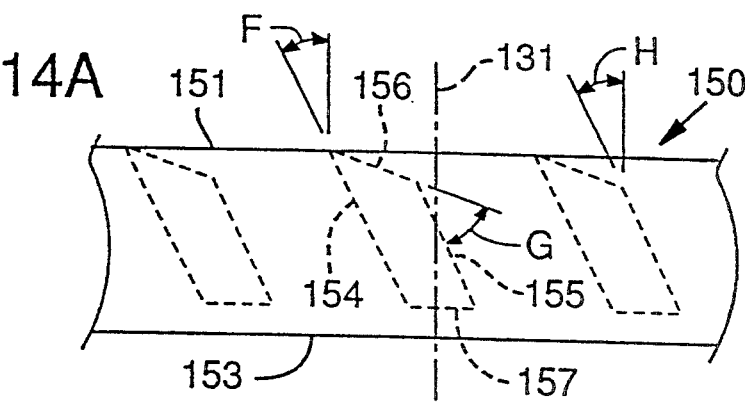
FIG. 14A is a flattened view of the cams of the index ring of FIG. 14.

The index ring 150 as shown in FIG. 11 is a ring shaped cylindrical member having raised cams 152 on its interior surface 149. Refer also to FIGS. 14 and 14A (14A shows the cams in flattened detail). As shown, the cams 152 have a leading edge 154 extending from end 151 at an angle F with respect to the longitudinal axis 131 of the ring 150 (the angle F being about 35 degrees). The leading edge 154 extends to a bottom edge 157 of the cam 152. The bottom edge 157 is near parallel to the lower end 153 of the ring 150 and extends from the leading edge 154 to a trailing edge 155. A landing edge 156 joined to the leading edge 154 at the end 151 extends at an angle G with respect to the edge 151 (the angle G being about 15 degrees) and is joined to the trailing edge 155. The trailing edge 155 extends from the landing edge 156 to the bottom edge 157 at an angle F (the angle F being about 30 degrees).

Refer once again to FIGS. 10 and 12. The clutch ring 110 is movable to a first position to be out of engagement with the inner gear 100 as shown in the lower half of FIG. 12 and to a second position where the clutch ring 110 is in engagement with the inner gear 100 as shown in the upper half of FIG. 12. The clutch ring 110 moved to the first position provides for independent rotation of the wheel 32 and the axle 30. The clutch ring 110 moved to the second position locks the rotation of the wheel 32 to the rotation of the axle 30 to provide unity of rotation.

The clutch ring 110 is urged to move to the first position by the return spring 120. The spring 120, being captive between the clutch ring 110 and the bushing 106 applies a force to the clutch ring 110 to move it to the first position. The clutch ring 110 is forced to move to the second position by a selectively controlled pulse of negative air pressure, that is, a partial vacuum is created within the defined air tight chamber defined by the sealing members previously described. Air is withdrawn from the chamber which applies a force to the diaphragm 160. The diaphragm 160 fitted to the piston 130 forces the piston to move. The piston 130 is in abutment with the clutch ring 110 and movement of the piston 130 causes the clutch ring 110 to move into engagement with the inner gear 100 with the clutch ring coming into abutment with the wave spring 122 as shown in the upper half of FIG. 12. The negative air pressure is controlled so that it is sufficient to overcome the biasing force of the return spring 120, but will not compress the wave spring 122. In this embodiment, the negative air pressure required to move the clutch ring into abutment with the wave spring 122 is on the order of eight inches of Hg. As air is withdrawn from the defined chamber, the diaphragm 160 will grip the cup 134 of the piston 130 due to the differential pressure acting on the diaphragm 160.

Figure 15B:
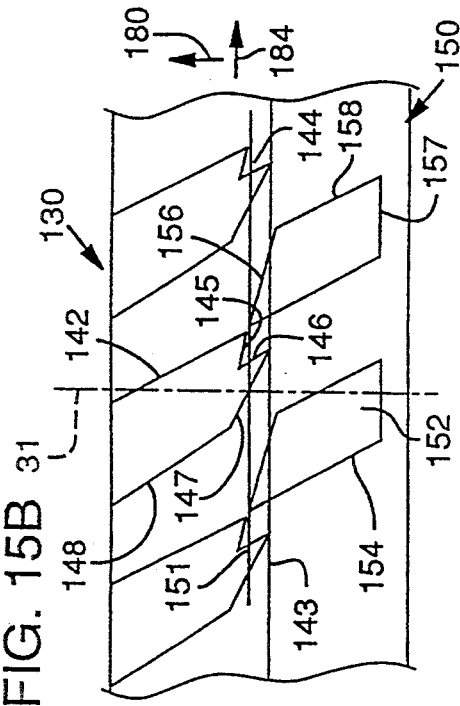
FIGS. 15A–15H are views showing the positional relation between the cams of the piston and an index ring of the wheel hub of FIG. 10.
Figure 15D:
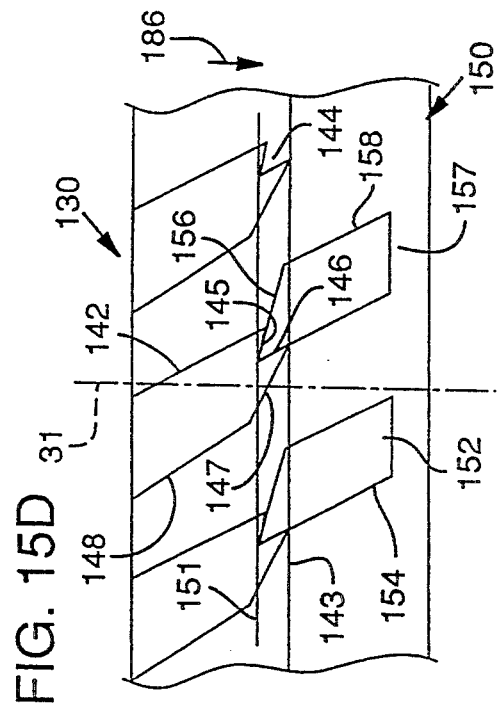
Figure 15A:
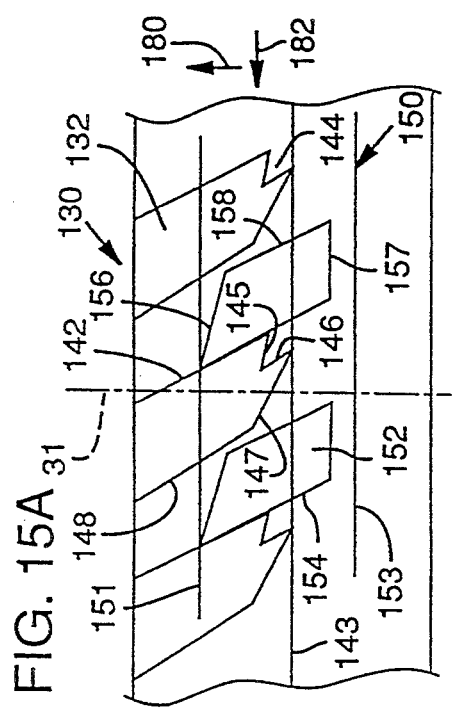
Figure 15C:
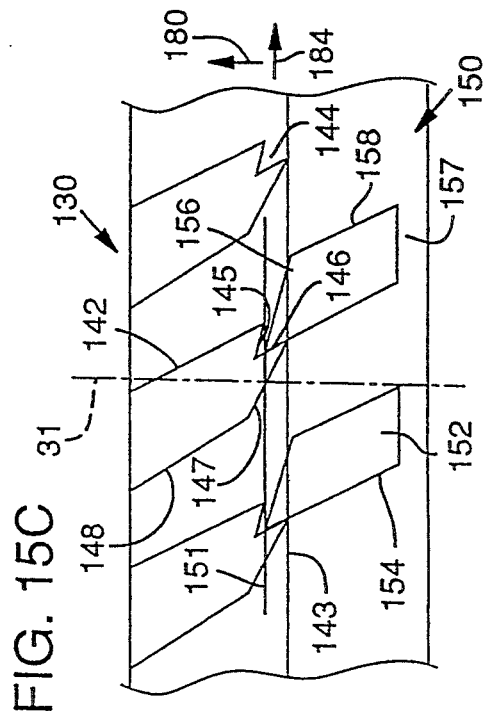

The piston 130 has its cams 132 in mesh with the cams 152 of the index ring 150. As the piston is moved the cams 132 and 152 will cooperatively cause the piston to rotate relative to the index ring and thus relative to the hub 80. Consider first the condition where the clutch ring 110 is out of engagement with the inner gear 100 as illustrated in the lower half of FIG. 12. The relative position of the cams 132 of the piston 130 and the cams 152 of the index ring are shown in FIG. 15A. The cams 132 and 152 are shown in flattened detail for illustrative purposes. As negative pressure is withdrawn from the defined chamber, the piston 130 will be moved axially, forcing the clutch ring toward engagement with the inner gear. As the piston is moved axially as indicated by arrow 180 in FIG. 15A, the leading edge 142 of cam 132 of the piston 130 will be in sliding engagement with the leading edge 154 of the cam 152 of the index ring 150. This will cause the piston 130 to rotate about the rotational axis 31 as indicated by arrow 82. The rotation of the piston 130 will twist the diaphragm 160 gripping the cup 134 of the piston to provide a resistive biasing torque on the piston 130. The diaphragm 160 can be considered to be a loadable biasing member, that is it does not provide any rotational biasing force until it is twisted. As the piston 130 is moved further as indicated in FIG. 15B, the leading edge 142 of the cam 132 will clear the leading edge 154 of the cam 152. When the leading edges 142 and 152 clear, the piston will have moved the clutch ring 110 into abutment with the wave spring 122 and into engagement with the inner gear 100 as shown in the top half of FIG. 12. The diaphragm 160 which has been rotationally twisted by the rotation of the piston, will cause the piston to rotate in the direction indicated by directional arrow 184. As the piston rotates as indicated by arrow 184, the edge 146 of the notch 144 will come into contact with the leading edge 154 of the cam 152 as indicated in FIG. 15C. The negative air pressure is released by venting the defined chamber to the atmosphere. The return spring 120 will urge the tip of the cam 152 (the tip being defined by the juncture of the leading edge 154 and the landing edge 156) to seat fully in the notch 144 of the cam 132 as shown in FIG. 15D. The clutch mechanism is thus in a latched position to couple (lock) the wheel 32 and the axle 30 together. With the pressure equalized on both sides of the diaphragm 160, the diaphragm releases its grip on the cup 134 of the piston 130. The negative air pressure is only applied for a short duration of time to affect latching of the clutch mechanism.

Figure 15F:
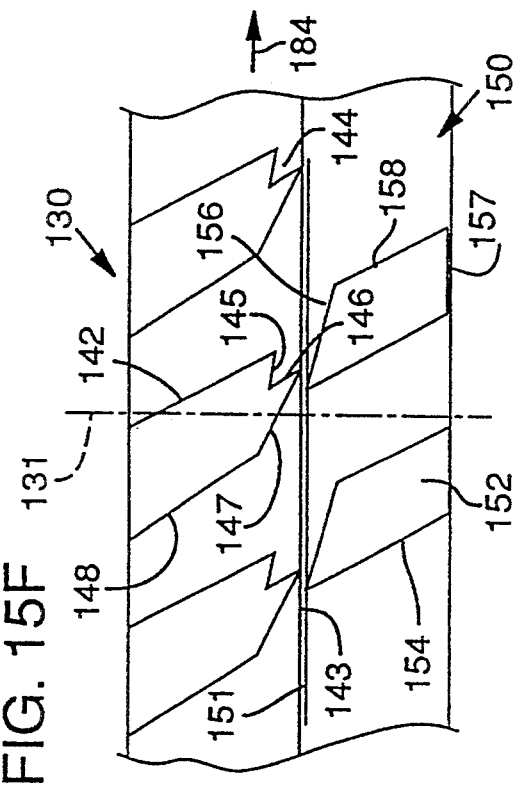
Figure 15H:
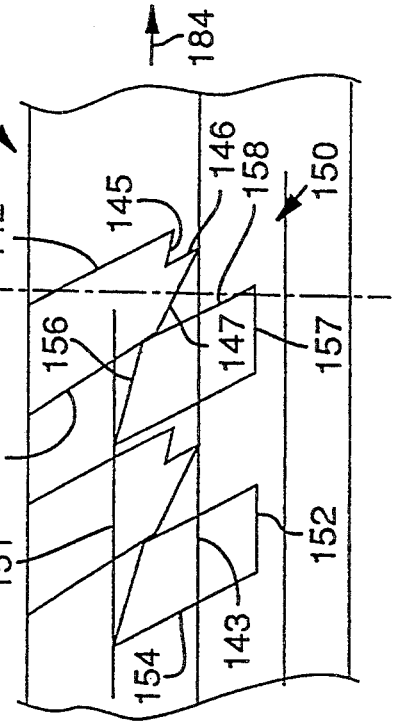
Figure 15E:
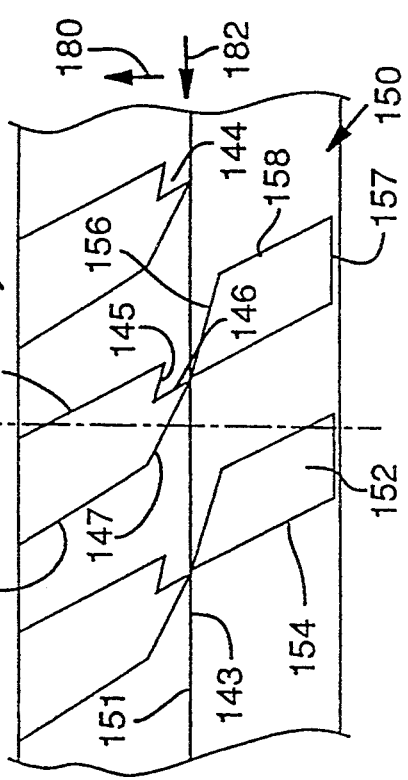
Figure 15G:
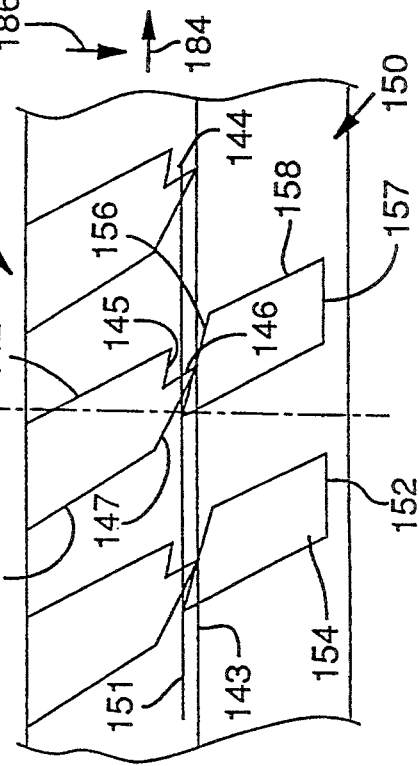

The wheel 32 is uncoupled from the axle 30, that is the clutch ring 110 is moved out of engagement with the inner gear 100 by applying a second selectively controlled pulse of negative air pressure to the defined chamber. The magnitude of the negative air pressure required to accomplish uncoupling is greater than the negative air pressure utilized to affect engagement. The negative air pressure required to accomplish uncoupling the wheel from the axle is on the order of fourteen inches of Hg and will hereafter be referred to as the second pressure. The second pressure is applied which causes the diaphragm 160 to once again grip the cup 134 of the piston 130. The second pressure is of sufficient magnitude to move the clutch ring 110 to compress the wave spring 122. The second pressure applied forces the piston 130 to move in the direction indicated by arrow 180 in FIG. 15E. As the piston 130 moves, the edge 146 of the notch 144 will be in sliding contact with the leading edge 154 of the cam 152. The edge 146 sliding along the leading edge 154 will cause the piston to rotate as indicated by arrow 182 in FIG. 15E. This will twist the diaphragm 160 to provide a resistive biasing torque. The piston continues to move in the direction indicated by arrow 180 further compressing the springs 120 and 122 until the edge 146 of the cam 132 clears the edge 154 of the cam 152. When the edges 146 and 152 clear, the biasing torque of the diaphragm 160 will rotate the piston 130 as indicated by arrow 184 in FIG. 15F. The piston 130 will rotate sufficiently to move the tip of the notch 144 past the tip of the cam 152 as indicated in FIG. 15F. The second pressure is released to equalize the pressure on both sides of the diaphragm 160. The diaphragm 160 will release its grip on the cup 134. The return springs 120 and 122 will force the landing edge 147 of the cam 132 against the landing edge 156 of the cam 152 as shown in FIG. 15G. The biasing force of the springs 120 and 122 will force the piston to move axially as indicated by arrow 186 and rotationally due to the cam action or ramping action of the edges 147 and 156 as indicated by arrow 184. The piston 130, in effect, will be indexed rotationally with respect to the index ring 150. It will be appreciated that the spring 122 will provide a biasing force until it fully expands in the groove 124 of the hub 80. The spring 120 continues to urge the clutch ring 110 and the piston 130 to move axially until the clutch ring 110 is out of engagement with the inner gear 100 and the diaphragm 160 comes into contact with the retainer 176. As the piston 130 moves axially as indicated by arrow 186 in FIG. 15H, it will also be rotated by the action of the cams 132, 152 as indicated by arrow 184. Only a pulse of the second pressure for a short duration is required to move the clutch ring out of engagement with the inner gear.

Figure 17:
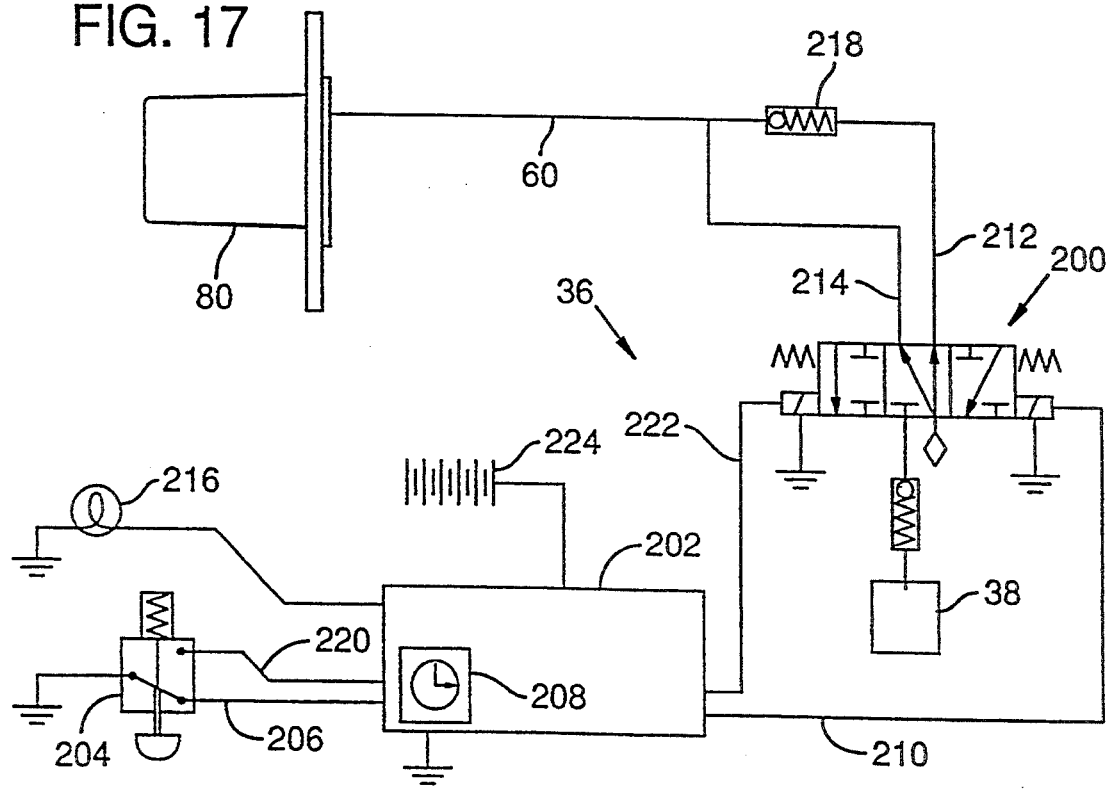

Refer now to FIG. 17 of the drawings. Controls 36 are provided to control the withdrawal and replenishment of air to the defined air tight chamber. In this embodiment, the intake manifold 34 of the engine 12 is utilized as a vacuum source. The reservoir 38 is coupled to the intake manifold 34 to ensure an adequate source of negative air pressure. The reservoir 38 is coupled to each of the front wheel hubs via a three way control valve 200 and the air line 60. In this embodiment, the valve 200 is normally closed with the center port (and thus the air line 60) vented to the atmosphere. The solenoid valve 200 is operated by a controller 202. The controller is enabled by the toggle switch 204. When the switch 204 is depressed or toggled as indicated in FIG. 17 to complete the circuit via line 206, a timer 208 of the controller is activated and the solenoid valve 200 is energized via line 210. The solenoid valve 200 energized via line 210 will open the port coupling the air line 212 to the reservoir 38 and close the center port. Air line 212 is thus coupled to the reservoir 38 (and the intake manifold 34) via the valve 200. A vacuum regulator 218 is provided in the air line 212 to limit the magnitude of the negative air pressure attained in the line 60 and thus the defined cavity (chamber) within the hub 80. The timer 208 will maintain the port connected to the air line 212 open for a set period of time that is sufficient to actuate the pulse operated clutch mechanism to move the clutch ring 110 into engagement with the inner gear 100 and latch the piston 130 in position on the index ring 150. When the time period has elapsed, the solenoid valve 200 is de-energized, the port coupling the air line 212 to the reservoir 38 is closed and the center port is once again opened to vent the defined chamber of the hub to the atmosphere via air line 60 and air lines 212 and 214. A lamp 216 connected to the engaging circuit is provided to indicate that the hubs are in the locked condition.

The hubs are unlocked by depressing the switch 204 to complete the circuit to the controller 202 via line 220. This will set the timer 208 for a new and different time period and will energize the solenoid valve 200 via line 222. The center port of the valve 200 will close and the port coupling the air line 214 to the reservoir 38 will be opened. Full negative pressure (vacuum) afforded by the vehicle 10 will be withdrawn from the hub 80 to affect uncoupling the wheel hub from the axle by unlatching the piston from the index ring as previously described. After the time period has elapsed, the solenoid valve 200 will be de-energized, the port coupling the line 214 to the reservoir 38 will be closed and the center port will be opened to vent the defined cavity of the hub to the atmosphere. The lamp 216 will be switched off at the end of the timed interval to indicate the hubs are no longer engaged. Power to operate the controller and the solenoid valve is provided by the vehicle battery 224.

The following disclosure illustrates use of the present invention in the context of a more sophisticated control strategy, i.e., where a programmable electronic control module orchestrates control activity throughout the vehicle in response to vehicle conditions and driver input activity.

Figure 18:
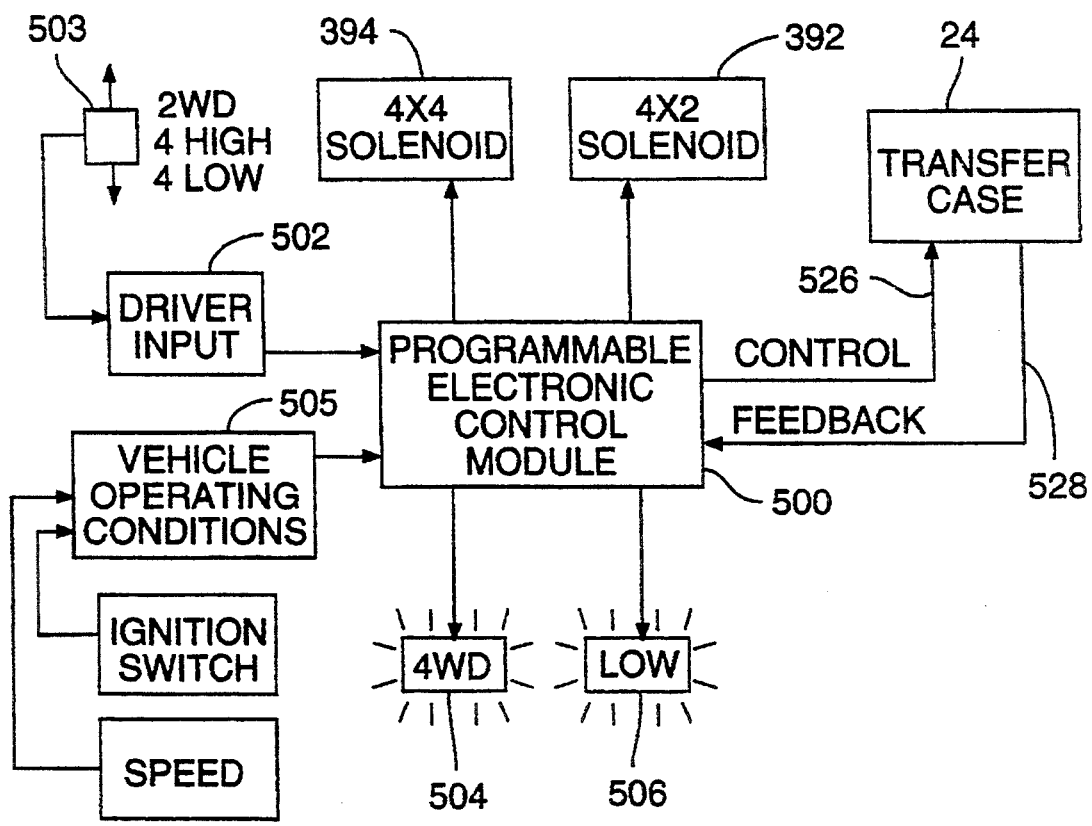
FIG. 18 illustrates a control arrangement for a vehicle including a central control module orchestrating vehicle control including manipulation of the pulse activated clutch mechanism of the present invention in coordination with transfer case operation, current vehicle operating conditions, and driver input.

FIG. 18 illustrates use of an electronic control module as it relates to operation of the pulse actuated clutch mechanism of the present invention. In FIG. 18, a programmable electronic module 500, by suitable programming described more fully hereafter, orchestrates operation of the solenoids 392 and 394 and transfer case 24 in response to transfer case conditions, driver input 502, and vehicle operating conditions 505. By suitably engaging the solenoids 392 and 394 in response to vehicle conditions and driver intent, the pulse actuated clutch mechanism of the present invention operates within the context of an electronic vehicle control system, i.e., under direction of programmable electronic control module 500.

A mode switch 503 supplies driver input 502 and permits the operator of the vehicle to select one of three operational modes, i.e., two-wheel drive (2 WD), four-wheel drive high range (4 WD), and four-wheel drive low range (4 LOW). In response to driver manipulation of mode switch 503, and following appropriate manipulation of the transfer case 24 and solenoids 392 and 394, module 500 operates dashboard indicators 504 and 506 to indicate to the driver vehicle operation in a given mode, i.e., according to operator manipulation of switch 503. A four-wheel drive indicator 504 is activated any time the vehicle is placed in four-wheel drive. The four-wheel drive low range indicator 506 is activated when the vehicle is in the low range mode of four-wheel drive operation. When neither of indicators 504 and 506 are activated, the vehicle is in two-wheel drive.

Certain vehicle conditions 505, e.g., vehicle speed and ignition switch position, are taken into account by module 500 when orchestrating state changes in the vehicle among the operational modes of two-wheel drive, four-wheel drive high range, and four-wheel drive low range. The operator thereby has sufficient control by way of module 500 to place the vehicle in any one of the three operational modes through manipulation of dashboard mode switch 503. In accordance with the present invention, module 500 orchestrates operation of the solenoids 392 and 394 and transfer case 24 suitably according to driver input 502 and current vehicle operating conditions 505.

As described above, the pulse actuated clutch mechanism of the present invention selectively couples and decouples the front wheels of a vehicle to the drive train for the purpose of operating in either two-wheel or four-wheel drive mode. By pulsing, i.e., actuating for a given time interval, both solenoids 392 and 394 the programmable electronic control module 500 places the pulse actuated clutch mechanism into a four-wheel drive mode, i.e., couples the front wheels to the transfer case 24. By actuating only the solenoid 392, however, module 500 decouples the front wheels from transfer case 24. In either case, the solenoids 392 and 394 are pulse actuated, i.e., need only be activated for a given time interval to move the pulse actuated clutch mechanism into a desired condition. The transfer case 24 must be operated in coordination with the solenoids 392 and 394 and current vehicle conditions to suitably couple or decouple the drive line to the pulse actuated clutch mechanism of the present invention according to driver input 502.

Figure 19:
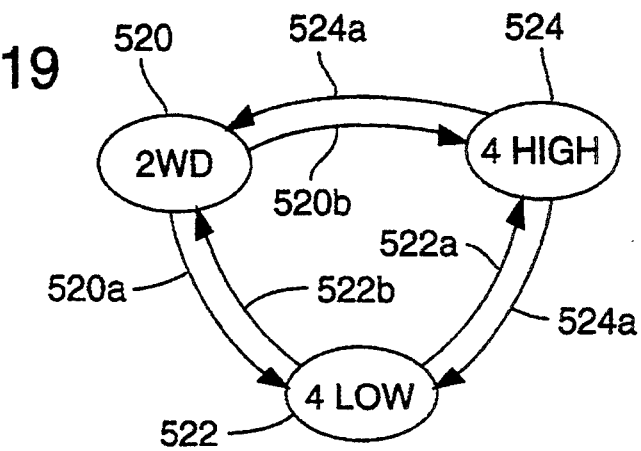
FIG. 19 illustrates three states of operation for the transfer case of a vehicle, including two-wheel drive, four-wheel drive high range, and four-wheel drive low range states of operation.

FIG. 19 illustrates three system level states of operation. In FIG. 19, transfer case 24 operates in a two-wheel drive state 520, a four-wheel drive low range state 522, or a four-wheel drive high range state 524. As may be appreciated, programmable electronic control module 500 provides control signals 526 (FIG. 18) to transfer case 24 and receives an electronic feedback signal 528 (FIG. 18) from transfer case 24 to drive the transfer case 24 among the operational states 520, 522, and 524. As seen in FIG. 19, transition from any one of states 520, 522 and 524 to any one of the other states, 520, 522 and 524 is allowed. Thus, two transition paths extend from each of the states 520, 522 and 524. For example, transition paths 520a and 520b extend from state 520 to the states 522 and 524, respectively. Transition paths from states 522 and 524 are similarly labeled in FIG. 19.

With respect to operation of the pulse actuated clutch mechanism of the present invention, transition between the fourwheel drive high range state 524 and four-wheel drive low range state 522 need not include manipulation of the pulse actuated clutch mechanism of the present invention. In both of these states, the pulse actuated clutch mechanism is engaged or locked, i.e., coupled the drive line 26 as provided by transfer case 24 to the front wheels of the vehicle. Transition between two-wheel drive state 520 and either of the four-wheel drive states 522 and 524, however, must include manipulation of the pulse actuated clutch mechanism of the present invention. In particular, if the vehicle is going from two-wheel drive state 520 to either of states 522 or 524, i.e., along either of transition paths 520a and 520b, the pulse actuated clutch mechanism of the present invention must be engaged. Transition from either of four-wheel low range state 522, i.e., along path 522b, or from four-wheel drive high range state 524, i.e., along path 524a, to two-wheel drive state 520 requires decoupling of the pulse actuated clutch mechanism of the present invention.

Module 500 dictates operation of the transfer case 24 in coordination with operation of solenoids 392 and 394 to satisfy driver input 502 as represented by switch 503 indicating a desired transition among the states 520, 522 and 524. In orchestrating operation of the solenoids 392 and 394, module 500 must guarantee establishment of the pulse actuated clutch mechanism and transfer case 24 in the desired mechanical state. Because the pulse actuated clutch mechanism, as illustrated herein, provides no feedback to module 500 regarding its physical state, the control scheme adopted should guarantee placement of the pulse actuated clutch mechanism in the desired state without aid of feedback.

Module 500 must account for such abnormal scenarios as rapid driver manipulation of switch 503 during transition of the pulse actuated clutch mechanism from one state to another state, i.e., from a locked state to an unlocked state or from an unlocked state to a locked state. Accordingly, module 500 must take into account the possibility of rapid cycling of the switch 503 and ultimately achieve the driver's intended state for the vehicle, i.e., appropriately place the vehicle in either two-wheel drive, fourwheel drive high range or four-wheel drive low range state according to the ultimate position of mode switch 503. Generally, driving the pulse actuated clutch mechanism into a desired state requires application of appropriate vacuum pressure throughout a given locking or unlocking interval. Interrupting the locking or unlocking procedure with respect to the pulse actuated clutch mechanism can place the mechanism in an indeterminate state, and thereby not satisfy the goal of guaranteeing placement of the pulse actuated clutch mechanism in the desired state. Module 500 operates at much higher speed then that of the mechanical operation of the pulse actuated clutch mechanism from one state to another. Accordingly, it is important that the control scheme adopted not let the mechanical state of the pulse actuated clutch mechanism lag behind the module 500 control procedure. The application of appropriate vacuum pressure to the pulse actuated clutch mechanism requires a source of energy, i.e., electrical energy for the solenoids and a source of vacuum pressure. Thus, to ensure completion of a given transition in state of the pulse actuated clutch mechanism, the control scheme must ensure that a source of energy is present throughout the interval of transition. Accordingly, the control scheme adopted makes reference to the current state of the ignition switch to ensure a source of energy, i.e., intermittently verifies that the ignition switch is in its run position to ensure a source of energy for appropriate transition in state of the pulse actuated clutch mechanism.

FIGS. 20-26 illustrate programming of the electronic control module 500 as such programming relates to operation of the solenoids 392 and 394 and transfer case 24 in response to driver input 502 and feedback 528 obtained from transfer case 24. The programming illustrated herein will be linear programming showing movement of the processing steps from one state to the next, and including representation of loop features wherein processing may pause for a given interval pending a given event. Because a vehicle control system such as module 500 is concurrently responsible for a variety of vehicle control tasks beyond that illustrated herein, such systems are often implemented in a multitasking control scheme wherein module 500 would actually engage in many tasks on a time-share basis according to known multi-tasking programming techniques. For the purpose of clarity, however, programming of module 500 as it relates to the present invention will be represented as if no other control tasks are being executed concurrently by module 500. It will be understood, therefore, that the programming illustrated herein can be converted by ordinary skill in the art to a multi-tasking control scheme providing the same functionality with respect to the present invention as represented in the flow charts herein.

FIG. 20 illustrates by flow chart an initialization routine executed upon engine start-up. In FIG. 20, processing beings in block 530 where module 500 de-energizes both solenoids 392 and 394. This ensures that the vehicle remains in its last state, i.e., that the pulse actuated clutch mechanism of the present invention remains in the state corresponding to the previous engine shut down.

In decision block 532, module 500 interrogates the condition of mode switch 503. This step compensates for the potential of the mode switch 503 being moved during the period of engine shut down. Mode switch 503 should present one of three valid states, i.e., corresponding to two-wheel drive selection, four-wheel drive high range selection, and four-wheel drive low range selection. If switch 503 does not present a valid signal, then processing branches from decision block 532 to block 534 where module 500 sets a diagnostic trouble code (DTC) and processing exits the initialization routine of FIG. 20. As may be appreciated, such diagnostic trouble code would then later be used to determine appropriate action. For example, a default mode of operation, e.g., two-wheel drive, may be invoked when in block 532 switch 503 appears to be malfunctioning.

If, however, mode switch 503 presents a valid signal, then processing advances to decision 536 where module 500 compares the current state of mode switch 503 with the current state of transfer case 24 as represented by a contact plate position sensor providing a portion of feedback 528 to module 500. If the contact plate of transfer case 24 presents in feedback 528 a condition compatible with the mode switch 503, then processing passes through block 538, where the indicators 504 and 506 are activated as necessary according to the current mode of operation, and processing exits the initialization routine.

If, however, feedback 528 represents to module 500 that the contact plate position as represented in feedback 528 is incompatible with the driver operated mode switch 503, then processing branches to decision block 540 where module 500 determines the validity of the contact plate position reading obtained from feedback 528. If the contact plate reading of feedback 528 is invalid, then processing branches to block 542 where module 500 uses a limited operating strategy (LOS) to shift to a desired state. In other words, when feedback 528 indicates an invalid condition for transfer case 24, i.e., not one of the allowed states 520, 522 and 524, then an alternate control strategy is employed to get transfer case 24 into a valid state. From block 542, processing exits the initialization routine of FIG. 20.

Returning to decision block 540, when the contact plate reading of feedback 528 is valid but simply incompatible with the state of mode switch 503, then processing branches to block 544 where normal shift strategies are used to place the vehicle in a desired state, i.e., establish the appropriate state for transfer case 24 and solenoids 392 and 394 according to the current state of switch 503. From block 544, processing exits the initialization routine of FIG. 20.

Figure 24:
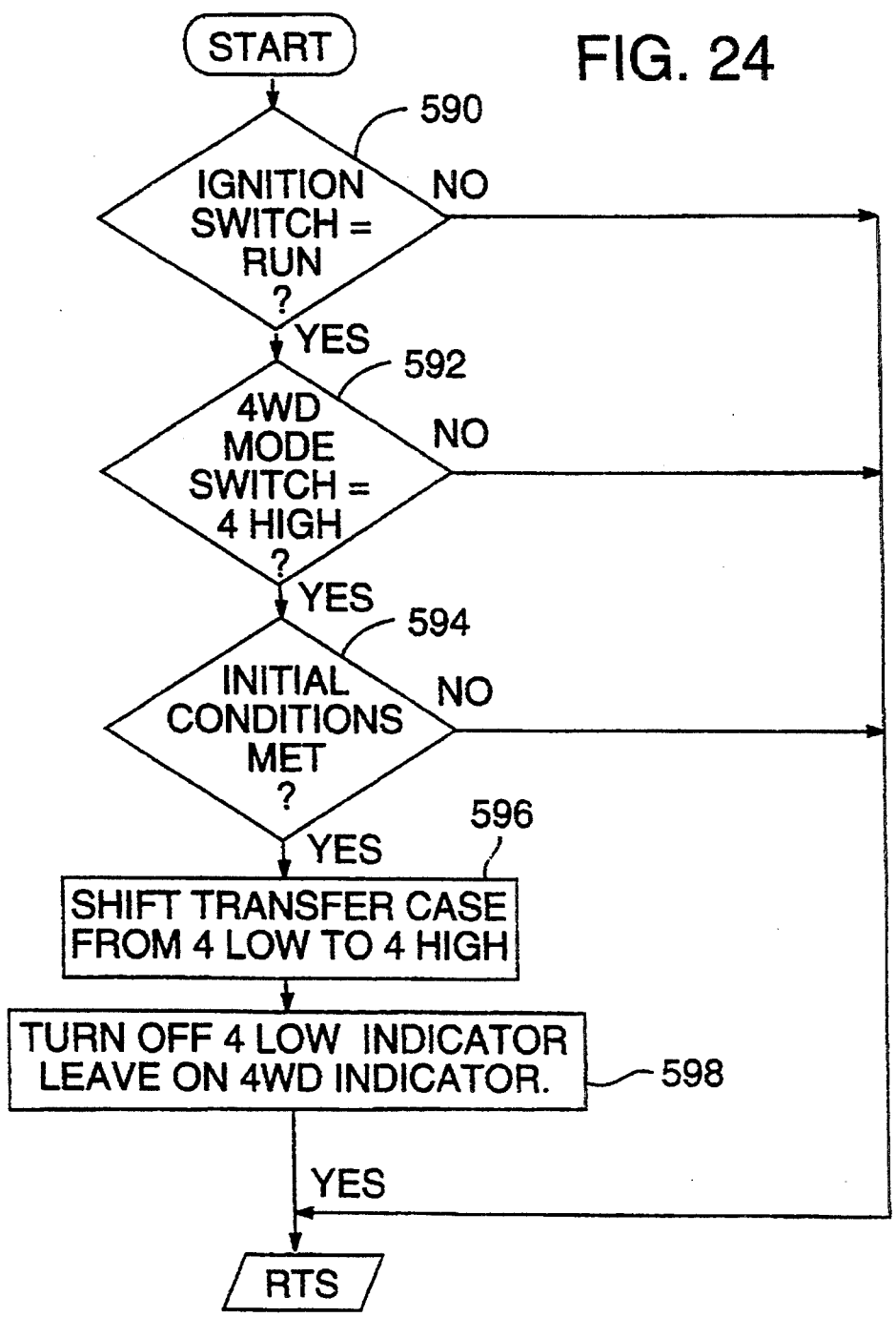
FIG. 24 is a flow chart illustrating control procedures executed when moving from a four-wheel drive low range state to a four-wheel drive high range state.
Figure 25A:
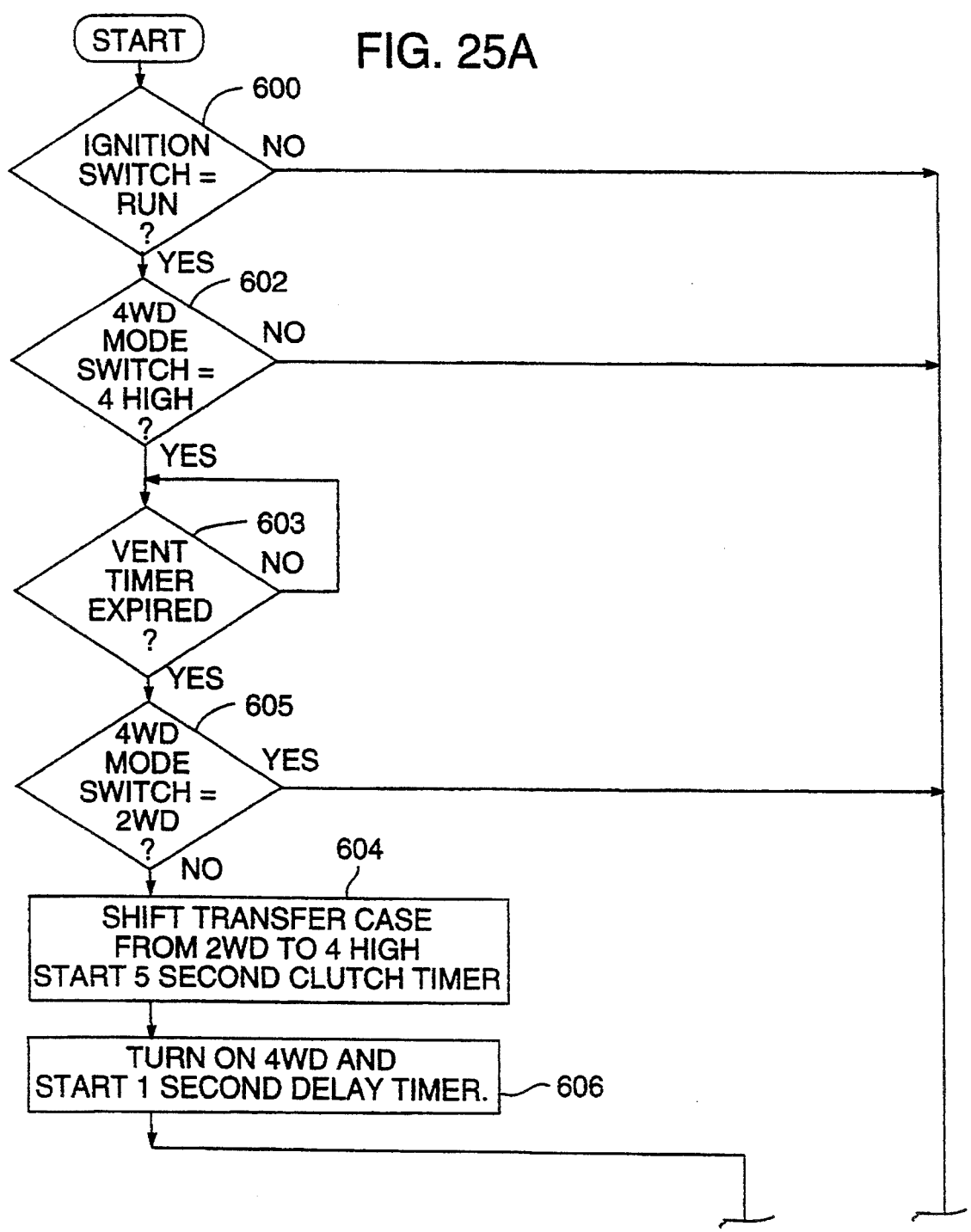
Figure 26:
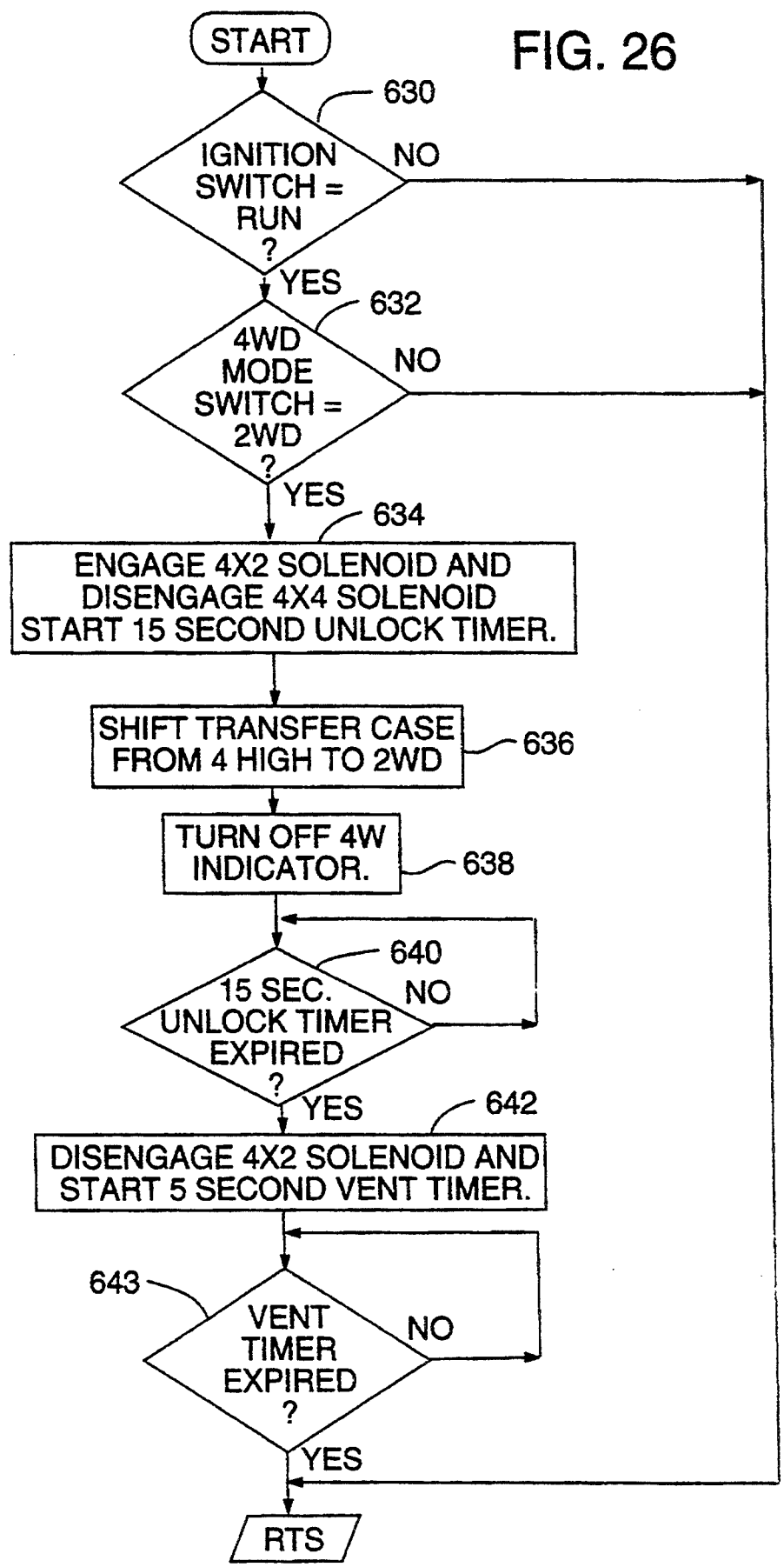
FIG. 26 is a flow chart illustrating control procedures executed when moving from a four-wheel drive high range state to a two-wheel drive state.

Processing represented by block 544 of FIG. 20 is further detailed in FIGS. 21-26, indicating generally shifting strategies among the drive states 520, 522 and 524. As processing enters block 544 of FIG. 20, module 500 has sufficient information to drive the vehicle into the desired one of states 520, 522, and 524. Based on the current state of transfer case 24 and the current state of mode switch 503, module 500 determines whether the vehicle is to go from two-wheel drive state 520 to fourwheel drive low range state 522 along path 520a (FIGS. 21A and 21B), from fourwheel drive low range state 522 to two-wheel drive state 520 along path 522b (FIG. 22), from four-wheel drive high range state 524 to four-wheel drive low range state 522 along path 524a (FIG. 23), from four-wheel drive low range state 522 to four-wheel drive high range state 524 along path 522a (FIG. 24), from two-wheel drive state 520 to four-wheel drive high range state 524 along path 520b (FIGS. 25A and 25B), or from four-wheel drive low range state 522 to two-wheel drive state 520 along path 522b (FIG. 26).

Thus, the six flow charts of FIGS. 21-26 represent control procedures applied to six state transition paths among the states 520, 522, and 524. An appropriate one of these control procedures is selected in block 544 of FIG. 20 at the time of initialization. Furthermore, during operation of the vehicle, module 500 will intermittently scan the state of mode switch 503 to detect a change in state thereof. In response to such change in state of mode switch 503 during operation of the vehicle, i.e., following powerup and initialization of module 500, module 500 will respond to such state change in switch 503 select an appropriate one of the control procedures illustrated in FIGS. 21-26 to implement a change in vehicle state according to driver intent as represented by a new position of mode switch 503.

Figure 21A:
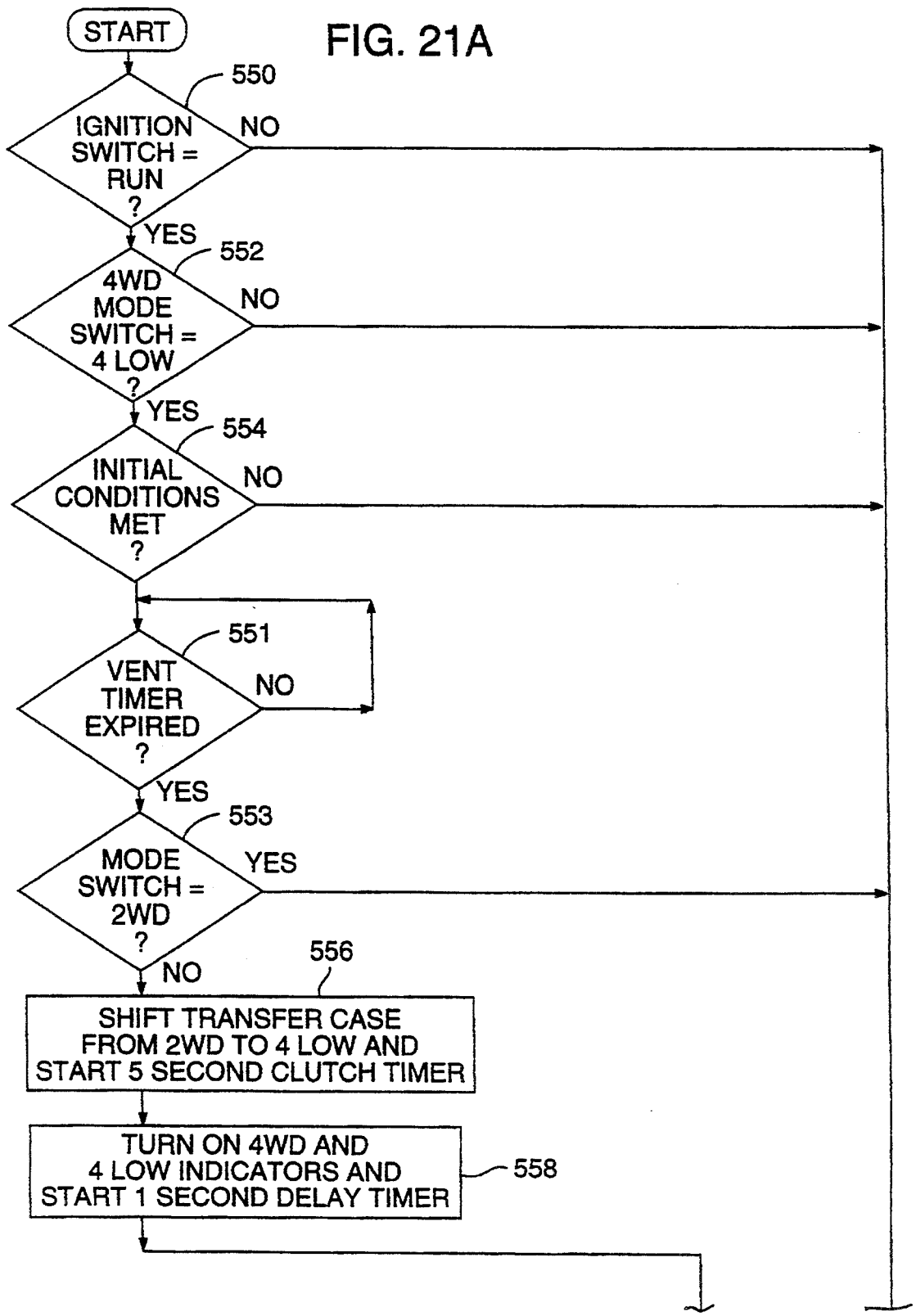

FIGS. 21A and 21B illustrate processing executed when moving from two-wheel drive state 520 to four-wheel drive low range state 522, i.e., along transition path 520a of FIG. 19. In FIGS. 21A and 21B, decision block 550 verifies that the ignition is in the run state, decision block 522 verifies that the driver operated mode switch 503 is in the four-wheel drive low range position, and decision block 554 determines that certain initial conditions are satisfied. As previously noted, the ignition switch must be in the run position to ensure a source of energy for moving the pulse actuated clutch mechanism between its two states of operation. Module 500 makes one last scan of mode 503 in decision block 552 to verify that the mode switch 503 is in fact in its four-wheel drive low range position prior to commencing control procedures to drive the pulse actuated clutch mechanism into its locked or engaged state. Thus, decision block 552 provides an abort path if the switch 503 does not match the proposed control procedures to be executed in FIGS. 21A and 21B. The initial conditions tested in decision block 554 include verifying that the vehicle speed is less than, for example, three miles per hour to protect the transfer case against damage when shifting from a high range state to a low range state, verifying that the transmission is in a neutral state (for automatic transmissions) or that the driver operated clutch pedal is depressed (for manual transmissions), and that the driver operated brake pedal is depressed to ensure safety of vehicle operation when shifting into a new drive state. A negative result from any of the decision blocks 550, 552 and 554 exits the illustrated routine.

Continuing to decision block 551, processing loops until a vent timer has expired. The vent timer ensures that the pulse actuated clutch mechanism has completely exhausted its vacuum chamber following transition to a new state. As previously discussed, the control strategy must ensure that the pulse actuated clutch complete its mechanical change of state before attempting to drive the pulse actuated clutch into another state. Thus, the vent timer is set at the beginning of the venting cycle of operation, and its expiration represents completion of the venting cycle. Thus, the vent timer would be set by another control procedure, and checked in the procedure of FIG. 21A to verify that a previously initiated state transition for the pulse actuated clutch mechanism is complete. Generally, the vent timer is set when moving from four-wheel drive to two-wheel drive modes of operation, i.e., when moving from either of four-wheel drive high range state 524 or four-wheel drive low range state 522 to two-wheel drive state 520. Once the vent timer expires, processing advances to decision block 53 where module 500 interrogates the status of mode switch 503. Decision block 553 represents an opportunity to interrogate the state of mode switch 503, and abort further control procedures driving the system into the proposed four-wheel drive low range state 522. If mode switch 503 is in the two-wheel drive state, then processing exits at decision block 553. If, however, the mode switch 503 is not in the two-wheel drive position, then processing advances to block 556.

In block 556, module 500 physically shifts transfer case 24, i.e., by control signal 526 (FIG. 18), from two-wheel drive to four-wheel drive low range. Also in block 556, module 500 sets a 5 second clutch timer later used to verify sufficient time interval for mechanical operation of the transfer case 24 electric clutch. Continuing to block 558, indicators 504 and 506 are both activated to indicate operation of the vehicle in four-wheel drive low range mode. Also in block 558, module 500 sets a 1 second delay timer used to allow transfer case 24 sufficient time to complete its shifting operation, i.e., to allow the mechanical operation of transfer case 24 to maintain synchronization with module 500 control procedures.

Proceeding from block 558 to decision block 559 (FIG. 21B), module 500 interrogates the delay timer set in block 558. Processing loops at decision block 559 until the delay timer has expired. Once the delay timer has expired, processing advances to decision block 563. In decision block 563, module 500 interrogates the 5 second clutch timer set in block 556. If the 5 second clutch timer has expired, then processing branches from decision block 563 through block 565, where module 500 turns off the transfer case 24 electric clutch, and branches to decision block 560. At this point, the 5 second clutch timer has expired and module 500 has determined that transfer case 24 is in an appropriate condition for the state change of the pulse actuated clutch mechanism. If, however, the 5 second clutch timer has not yet expired, then processing branches at block 563 to decision block 567 where the switch 503 is interrogated. Decision 567 is executed as one of several opportunities to again test the condition of mode switch 503 to verify that it has remained in a position compatible with the proposed pending state transition in the pulse actuated clutch mechanism. If switch 503 is in its four-wheel drive low range position, then processing branches to decision block 560 for continued processing in anticipation of transition to state 522. Otherwise, processing branches from decision block 567 to block 569, where module 500 turns off the transfer case 24 electric clutch, and terminates. As may be appreciated, appropriate control procedures would then be executed, i.e., selection of one of the control procedures of FIGS. 21-26, to drive the vehicle into the state represented by the current condition of mode switch 503.

In decision block 560, module 500 detects current vehicle speed. If vehicle speed exceeds 5 kilometers per hour, then processing advances to block 562. Decision block 560 guarantees vehicle speed in excess of a given speed, in this case, 5 kilometers per hour, required to avoid a binding condition in the gears coupling the vehicle front axle and the wheel, i.e., drive engagement gears in the pulse actuated clutch mechanism. In order for these gears to mesh, the vehicle must be moving in excess of a given speed. If vehicle speed is currently less then 5 kilometers per hour, then processing branches from block 560 to block 561 where module 500 interrogates the current ignition switch condition and loops at decision block 561 until the ignition switch is in its run position. Once the ignition switch is in its run position, processing advances to decision block 563 where module 500 interrogates the 5 second clutch timer. If the 5 second clutch timer has expired, then processing advances through block 565 where module 500 turns off the transfer case electric clutch, and then returns to decision block 560 where vehicle speed is again interrogated. If, however, the 5 second clutch timer has not yet expired in decision block 563, then processing advances to decision block 567 where module 500 interrogates the switch 503 position. If switch 503 is in its four-wheel drive low range position, then processing returns to block 560 where vehicle speed is interrogated. If, however, switch 503 is not in its four-wheel drive low range position, then processing branches through block 569, where module 500 turns off the transfer case 24 electric clutch, and terminates as described above.

After vehicle speed has exceeded 5 kilometers per hour, processing continues to block 562 where module 500 activates the 4×4 solenoid 394 and the 4×2 solenoid 392 to initiate a locking condition in the pulse actuated clutch mechanism. Also in block 562, control module 500 starts a 15 second lock timer.

In decision block 566, module 500 again interrogates the 5 second clutch timer. If the 5 second clutch timer has expired, then processing advances to block 568. If, however, the 5 second clutch timer has not yet expired, then processing advances to decision block 571 where module 500 takes the opportunity to interrogate the condition of mode switch 503. If switch 503 is in its four-wheel drive low range position, then processing returns from decision block 571 to decision block 566 where the 5 second clutch timer is again interrogated. If, however, the switch 503 is not in its four-wheel drive low range position, then processing exits, by way of block 569 where the transfer case 24 electric clutch is turned off, from the decision block 571. Thus, decision block 571 represents an opportunity to check the current condition of mode switch 503 in the event of rapid cycling by the operator of the vehicle. Decision block 566 handles the case where the 5 second clutch timer has not yet expired but vehicle speed is sufficient and both solenoids 392 and 394 may be activated while waiting for the 5 second clutch timer to expire. If, at decision block 566, the 5 second clutch timer has not expired then module 500 takes advantage of the remaining time of the 5 second clutch timer interval to monitor the condition of switch 503, and exit should switch 503 present a mode incompatible with the pending state transition.

Once the 5 second clutch timer has expired, as detected in block 566, processing continues from block 566 to block 568 where control module 500 turns off the electric clutch of transfer case 24. Following block 568, control module 500 loops at the decision block 570 until the 15 second lock timer has expired. More particularly, if the 15 second lock timer has not yet expired, then processing advances to decision block 573 where module 500 again takes the opportunity to interrogate the ignition switch condition. If the ignition switch is in its run position, then processing returns from decision block 573 to decision block 570 where the 15 second lock timer is again interrogated. If, however, the ignition switch is not in its run position, then processing branches from decision block 573 through block 575 where module 500 resets the 15 second lock timer and returns to decision block 573. Eventually, the ignition switch is placed in its run position and the 15 second lock timer expires. After the 15 second lock timer has expired in block 570, control module 500 disengages the 4×4 solenoid 394 and the 4×2 solenoid 392 in block 572. Following block 572, processing exits the routine of FIG. 21.

Thus, decision block 570 guarantees that the appropriate energy, i.e., electrical energy to the solenoids 392 and 394 and availability of sufficient vacuum pressure, has been applied to the pulse actuated clutch mechanism for the full 15 second interval to guarantee placement of the pulse actuated clutch mechanism in its desired state, i.e., in a locked state. If the power is turned off, i.e., the ignition switch not in its run position, then the 15 second lock timer is reset and processing loops until such time that a full 15 second interval of driving the pulse actuated clutch mechanism into its locked state has occurred.

Figure 22:
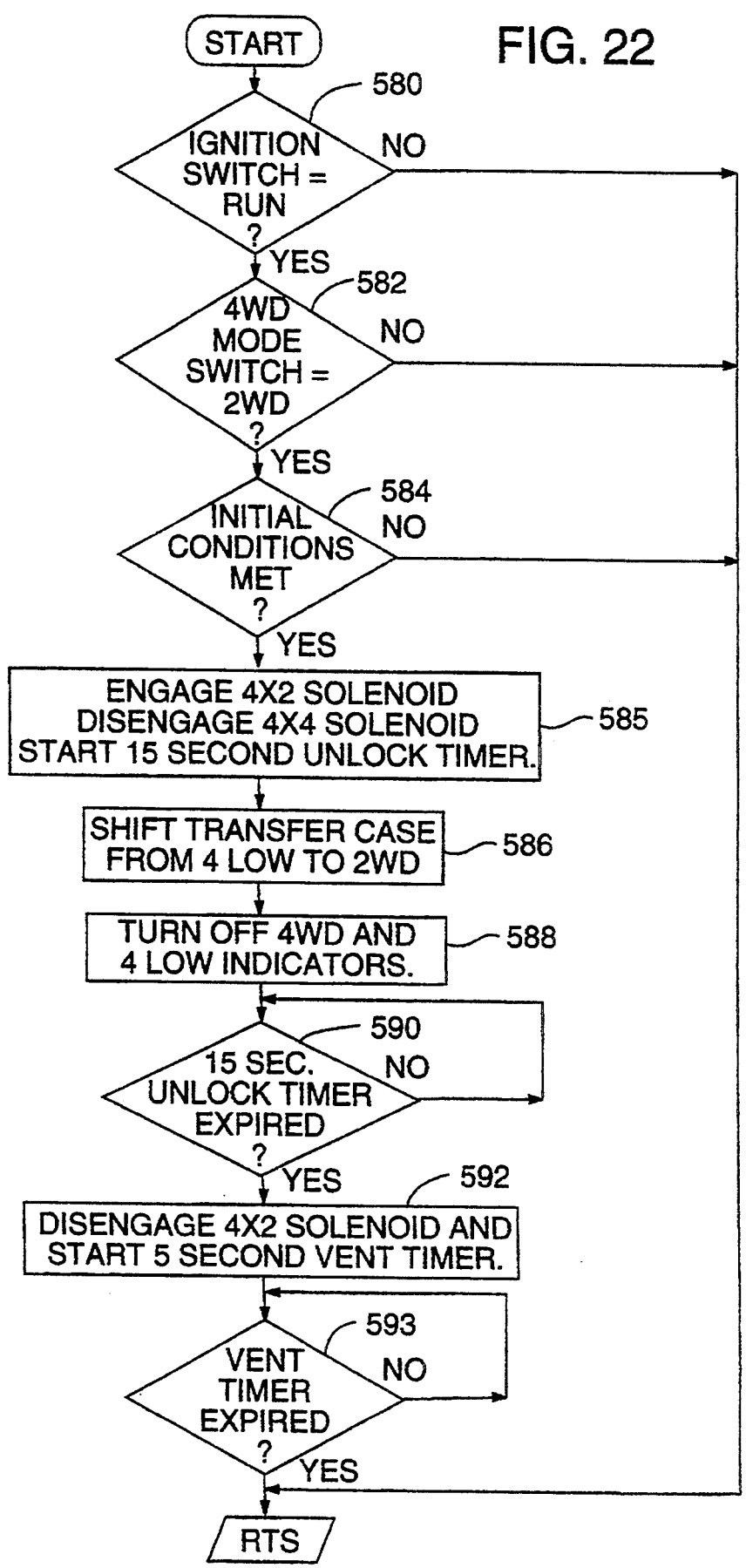
FIG. 22 is a flow chart illustrating control procedures executed when moving from a four-wheel drive low range state to a two-wheel drive state.

FIG. 22 illustrates processing executed when moving from fourwheel drive low range state 522 to two-wheel drive state 520, i.e., along the transition path 522b of FIG. 19. In FIG. 22, decision block 580 verifies that the ignition switch is in its run position, decision block 582 determines that the driver operated mode switch 503 is in the two-wheel drive position and decision block 584 determines that certain initial conditions are satisfied. The initial conditions of vehicle speed being less than a given amount, transmission in neutral and brake pedal depressed, are examined in decision block 584 as set forth above in connection with decision block 554 of FIG. 21A. Upon a negative result from any one decisions blocks 580, 582 and 584, processing exits the routine illustrated in FIG. 22.

Following a positive result in each of decision blocks 580, 582 and 584, processing advances to block 585 where module 500 activates the 4×2 solenoid 392 to initiate an unlocking condition in the pulse actuated clutch mechanism. Also in block 585, module 500 starts a 15 second unlock timer. Continuing to block 586, control module 500 applies control signal 526 to physically move transfer case 24 from its four-wheel drive low range condition to its two-wheel drive condition. In block 588, control module 500 deactivates both the dashboard indicators 504 and 506 to indicate operation in two-wheel drive mode. Module 500 then loops at the decision block 590 until the 15 second unlock timer has expired. After the 15 second unlock timer has expired, processing advances to block 592 where control module 500 disengages the 4×2 solenoid 392 and starts a 5 second vent timer. Continuing to decision block 593, module 500 loops at decision block 593 until the vent timer has expired. Following exit from block 593, processing of FIG. 22 terminates.

Figure 23:
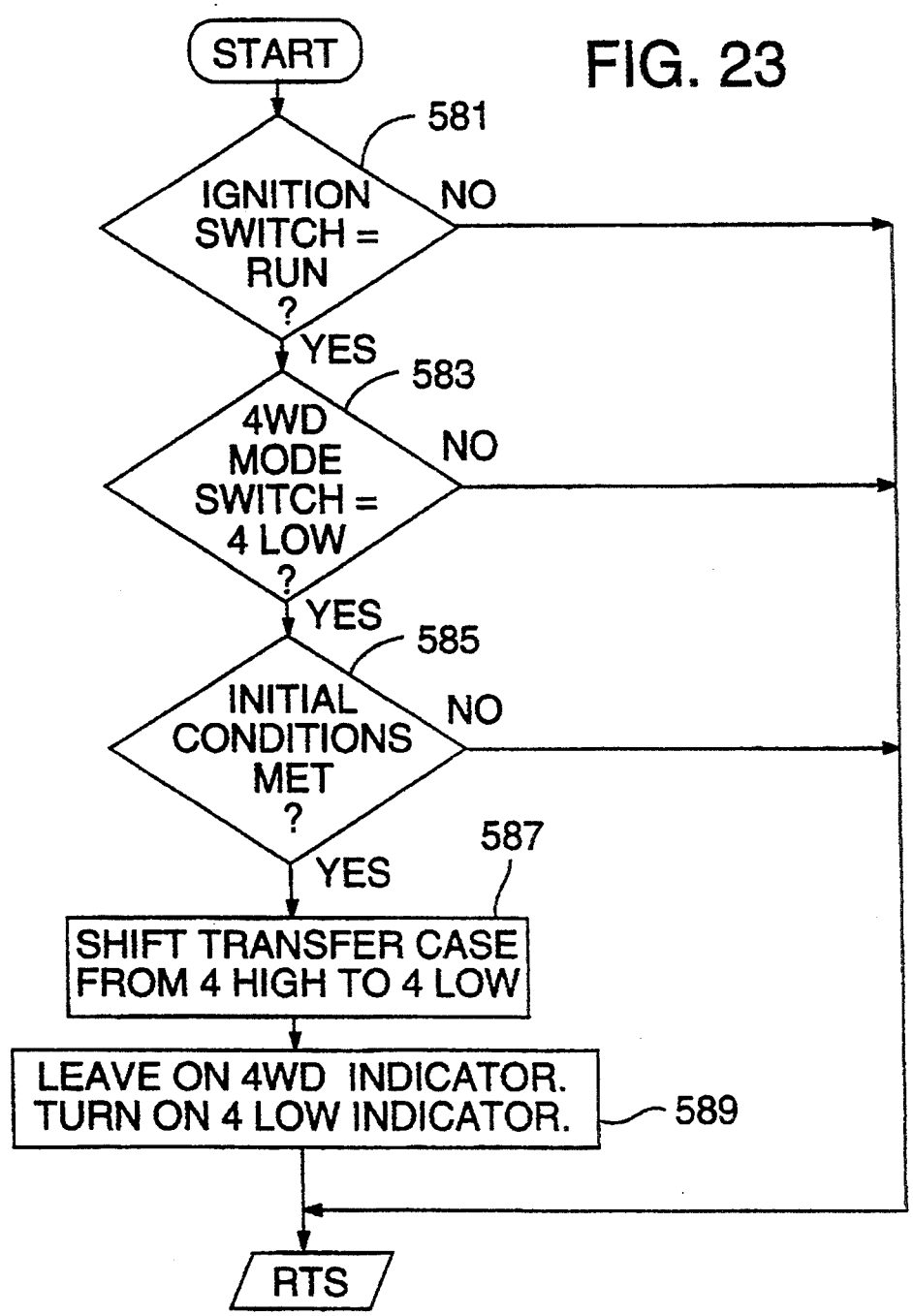
FIG. 23 is a flow chart illustrating control procedures executed when moving from a four-wheel drive high range state to a four-wheel drive low range state.

FIG. 23 illustrates transition from four-wheel drive high range state 524 to four-wheel drive low range state 522, i.e., along transition path 524a of FIG. 19. In FIG. 23, decision blocks 581, 583, and 585 determine the conditions of ignition switch in run position, driver operated mode switch in four-wheel drive low range position, and the above described initial conditions being met, respectively. A negative result from any one of decision blocks 581, 583 and 585 exits the routine illustrated in FIG. 23. If all of decision blocks 581, 583, and 585 indicate a positive result, then processing branches to block 587 where module 500 physically shifts transfer case 24 from its four-wheel drive high range condition to its four-wheel drive low range condition. Continuing to block 589, module 500 manipulates the indicators 504 and 506 to appropriately indicate operation in the four-wheel drive low range mode. Of interest, transition from the four-wheel drive high range to the four-wheel drive low range states requires no change in state in the pulse actuated clutch mechanism. Accordingly, there is no need for setting a 15 second timer or guaranteeing the transition of state in the pulse actuated clutch mechanism.

FIG. 24 illustrates transition from four-wheel drive low range state 522 to four-wheel drive high range state 524, i.e., along transition path 522a of FIG. 19. In FIG. 24, the decision blocks 590, 592, and 594 verify ignition switch in run position, four-wheel drive mode switch in four-wheel drive high range position, and that the above described initial conditions are met. A negative result from any one of decision blocks 590, 592, and 594 causes exit from the routine of FIG. 24. Assuming a positive result from each of decision blocks 590, 592, and 594, processing branches to block 596 where control module 500 physically shifts transfer case 24 from its four-wheel drive low condition to its four-wheel drive high range operating condition. In block 598, module 500 deactivates indicator 506 and leaves activated indicator 504 to show operation in the four-wheel drive high range mode. Again, because the control procedure represented by FIG. 24 involves no transition in the pulse actuated clutch mechanism, there is no concern for ensuring appropriate conditions for transition thereof.

FIGS. 25A and 25B illustrate programming associated with transition from two-wheel drive state 520 to four-wheel drive high range state 524, i.e., along transition path 520b of FIG. 19. The control procedures of FIGS. 25A and 25B bear similarity to that of FIGS. 21A and 21B in that both procedures involve transition from a two-wheel drive mode to a four-wheel drive mode. With respect to control over the pulse actuated clutch mechanism, these control strategies are similar in structure. In FIG. 25A, decision blocks 600 and 602 verify ignition switch in run position and mode switch 503 in four-wheel drive high range position, respectively. A negative result from either one of decision blocks 600 and 602 exits the routine illustrated in FIG. 25. Assuming a positive result from both of decision blocks 600 and 602, processing branches to decision block 603 where module 500 interrogates the vent timer. Processing loops at decision block 603 until the vent timer has expired. Once the vent timer has expired, processing in decision block 605 interrogates the current condition of mode switch 503. If mode switch 503 is in its two-wheel drive position, then processing terminates at the decision block 605. If, however, the mode switch 503 is not in its two-wheel drive position, then processing advances from decision block 605 to block 604.

In block 604, control module 500 physically shifts transfer case 24 from its two-wheel drive condition to its four-wheel drive high range condition. Also in block 604, module 500 sets the 5 second clutch timer. Then, in block 606, control module 500 activates the four-wheel drive indicator 504 and starts a 1 second delay timer. Continuing to decision block 607 from block 606, control module 500 loops until the delay timer set in block 606 expires. After the 1 second delay timer has expired, processing advances from decision block 607 to decision block 609 where module 500 interrogates the 5 second clutch timer. If the 5 second clutch timer has expired, then processing passes through block 611, where the transfer case 24 electric clutch is turned off, and continues to decision block 608. If, however, the 5 second clutch timer has not yet expired, then processing branches from block 609 to block 613 where module 500 takes the opportunity to interrogate the current state of mode switch 503. If mode switch 503 is not in its four-wheel drive high range position, then processing branches from decision block 613 through block 615 where the transfer case 24 electric clutch is turned off and then the processing of FIG. 25 terminates. If mode switch 503 is in its four-wheel drive high range position, however, processing branches from decision block 16 to decision block 608.

In decision block 608, module 500 interrogates current vehicle speed. If current vehicle speed exceeds 5 kilometers per hour, i.e., speed sufficient to mesh the gears of the pulse actuated clutch mechanism, then processing advances to block 610. If, however, current vehicle speed is less than 5 kilometers per hour, then processing branches from block 608 to decision block 617 where module 500 loops until the ignition switch is placed in its run position, after which processing advances to decision block 609 and beyond as described above.

Once the vehicle speed exceeds 5 kilometers per hour, as detected in block 608, processing advances to block 610 where control module 500 activates both the 4×4 solenoid 394 and the 4×2 solenoid 392. Also in block 610, control module 500 starts a 15 second lock timer.

Continuing to decision block 614, module 500 interrogates the 5 second clutch timer. If the 5 second clutch timer has expired, then processing advances to block 616. If, however, the 5 second clutch timer has not yet expired then processing advances from block 614 to decision block 619 where module 500 takes the opportunity to interrogate the current state of mode switch 503. If mode switch 503 is not in its four-wheel drive high range position, then the processing of FIG. 25 exits, by way of block 615 where the transfer case 24 electric clutch 13 turned off, at decision block 619. If the mode switch 503 is in its four-wheel drive high range position, however, processing branches at decision block 619 and returns to decision 614.

Following expiration of the 5 second clutch timer, in block 616 control module 500 turns off the electric clutch and then begins to loop at block 618 until the 15 second lock timer has expired. More particularly, if the 15 second lock timer has not yet expired, then processing branches from decision block 618 to decision block 621 where module 500 takes the opportunity to interrogate the vehicle ignition switch. If the vehicle ignition switch is in its run position, then processing returns from decision block 621 to decision block 618. If, however, the ignition switch is not in its run position, then processing branches from decision block 621 through block 623 where the 15 second lock timer is reset and returns to decision block 621. Eventually, the ignition switch is placed in its run position and the 15 second lock timer expires. Continuing to block 620, control module 500 turns off the 4×4 solenoid 394, turns off the 4×2 solenoid 392, and exits the routine illustrated in FIG. 25.

FIG. 26 illustrates processing associated with transition from four-wheel drive high range state 524 to two-wheel drive state 520, i.e., along transition path 524a of FIG. 19. In FIG. 26, decision blocks 630 and 632 verify that the ignition switch is in its run position and that the mode switch 503 is in its two-wheel drive position, respectively. A negative result from either one of decision blocks 630 and 632 exits from the routine illustrated in FIG. 26. Assuming a positive result from both of decision blocks 630 and 632, processing advances to block 634 where the control module 500 activates the 4×2 solenoid 392, deactivates the 4×4 solenoid 394 as a safety measure, and starts a 15 second unlock timer. Continuing to block 636, control module 500 physically shifts transfer case 24 from its four-wheel drive high range condition to its two-wheel drive condition. Continuing to block 638, control module 500 turns off the four-wheel drive indicator 504. Then, at block 640, control module 500 loops until the 15 second unlock timer expires. Following expiration of the 15 second unlock timer, control module 500 disengages in block 642 the 4×2 solenoid 394 and also sets the 5 second vent timer. Continuing to decision block 643, module 500 loops until the vent timer has expired and then exits the processing of FIG. 26.

With respect to use of the vent timer in the above described control strategies, it is important that the vent timer not be reset once it is initiated. If the transition in state of the pulse actuated clutch mechanism has reached the venting stage, it is important that this venting operation be completed. Accordingly, once the vent timer is set, it should be allowed to run its course through completion. For example, should the processing be interrupted during the venting cycle, the control strategy should maintain operation of the vent timer to allow completion of the venting cycle before initiating transition of the pulse actuated clutch mechanism to a new state.

Figure 27:
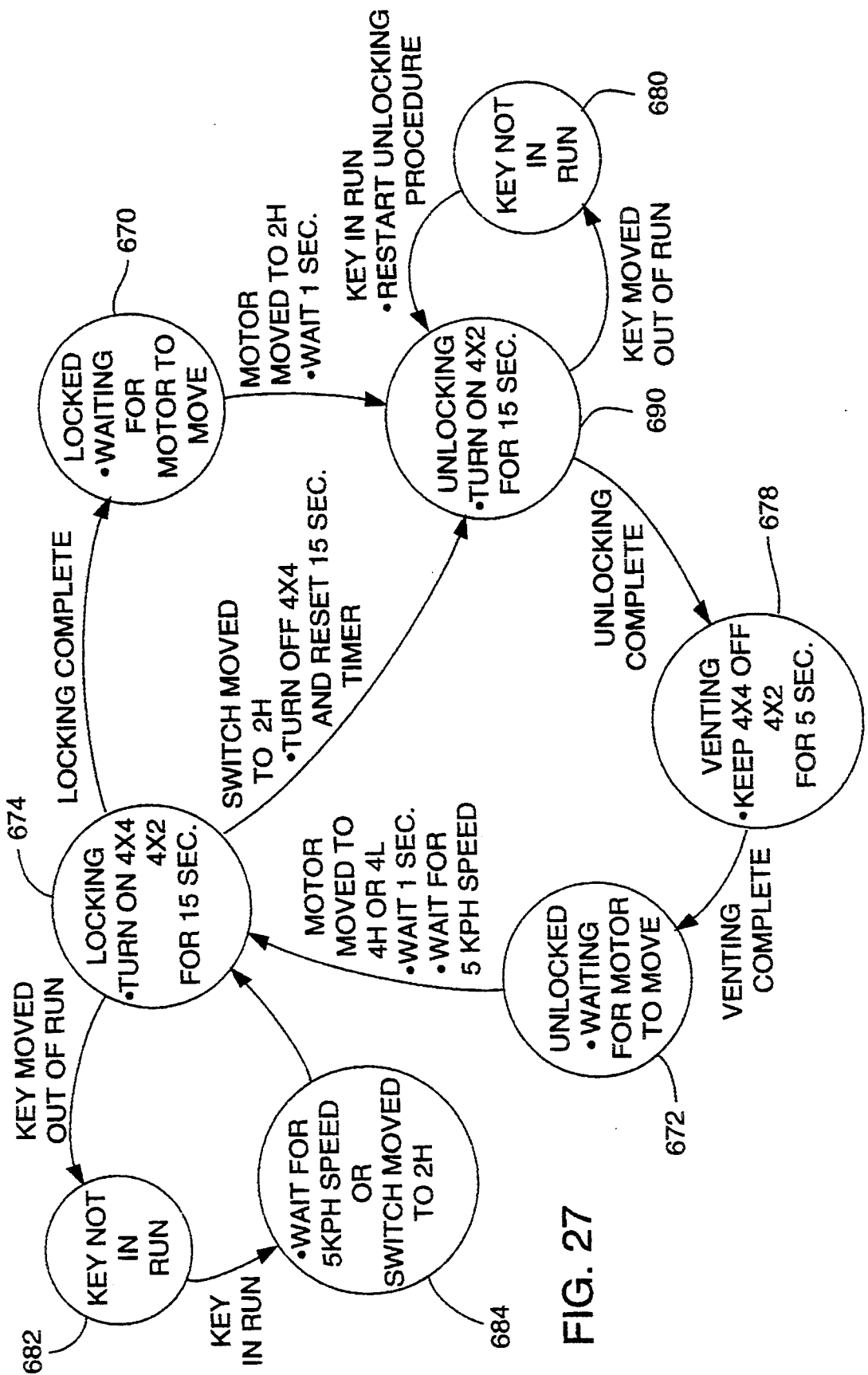
FIG. 27 is a state diagram illustrating states of operation for the pulse actuated clutch mechanism including states of locked, unlocked, locking, unlocking, and additional intermediate states as implemented under the present invention.

FIG. 27 is a state diagram illustrating various processing states for the pulse actuated clutch mechanism and the conditions for transition therebetween. In FIG. 27, locked state 670 represents the condition of the pulse actuated clutch mechanism when coupling the associated wheel and drive line. Unlocked state 672 represents disengagement at the pulse actuated clutch mechanism between the associated wheel and associated drive line. Transition from locked state 670 to unlocked state 672 is by way of an unlocking state 690 and a venting state 678. As the pulse actuated clutch mechanism moves into the unlocking state 690 from the locked state 670, the transfer case 24 is physically shifted into its two-wheel drive state 520 and the 1 second delay interval (as initiated in block 558 of FIG. 21A) occurs. Once in the unlocking state 690, the 4×2 solenoid 392 is activated for a 15 second interval to complete the unlocking procedure. Note that a condition of ignition key moving out of the run position causes transition from the unlocking state 690 to the key not in run state 680. Transition back to the unlocking state 690 from key not in run state 680 requires that the ignition key be moved to its run position, and also restarts the unlocking procedure, i.e., causes resetting of the 15 second unlocked timer. Exit from unlocking state 690 follows an unlocking complete path to the venting state 678. In venting state 678, the 4×4 solenoid 394 and 4×2 solenoid 392 remain disengaged for a 5 second interval. A venting complete path from venting state 678 provides entry to the unlocked state 672. Once in the unlocked state 672, transition to the locking state 674 occurs when a change in state of the pulse actuated clutch mechanism is required. As previously described, a 1 second delay interval and certain initial conditions, i.e., vehicle speed and transmission in neutral conditions, are required to reach the locking state 674. In the locking state 674, both the solenoids 392 and 394 are activated for a 15 second interval. Note that a key moved out of run path may cause exit from state 674 to a key not in run state 682. Exit from key not in run state 682 occurs when the key is returned to its run position. Under such key in run condition, the initial condition state 684 is reached. Once the initial conditions are satisfied, transition from state 684 back to the locking state 674 occurs. Upon return to locking state 674, the solenoids 392 and 394 are again activated for a full 15 second interval. Once the locking procedure is complete, a locking complete path provides access to the locked state 670.

Thus, a control strategy for orchestrating operation of the pulse actuated clutch mechanism in coordination with other vehicle operations, e.g., operation of the transfer case 24, has been shown and described. In accordance with the control scheme adopted, the pulse actuated clutch mechanism is reliably driven into a designated state without the aid of electronic feedback therefrom. Furthermore, the control strategy is adapted to respond to rapid cycling of the mode switch 503 to ultimately implement the driver intent. The control scheme includes mechanisms for ensuring a complete transition between locked and unlocked states of the pulse actuated clutch mechanism by allowing completion of such transition before initiating a next transition procedure. In this manner, the mechanical operation of the pulse actuated clutch mechanism does not lag behind the much faster operation of the electronic control module 500. This forces completion of a mechanical sequence and therefore more reliability places the pulse actuated clutch mechanism in the designated state. The control scheme also ensures that a source of energy is available throughout a given locking or unlocking procedure, and accounts for the possibility of an interruption in energy source by restarting the locking or unlocking procedure to provide a full interval of transition to a designated locked or unlocked state.

Those skilled in the art will recognize that modifications and variations may be made without departing from the true spirit and scope of the invention. The invention is therefore not to be limited to the embodiments described and illustrated but is to be determined from the appended claims.

What is claimed is:

1. A clutch mechanism and control arrangement providing selected coupling and decoupling of a vehicle wheel relative to a vehicle drive line, the clutch mechanism and control arrangement comprising:

at least one pulse actuated clutch attachable to said vehicle drive line and to said vehicle wheel, said pulse actuated clutch operable in a first state coupling said drive line and said wheel when attached thereto and operable in a second state decoupling said drive line and said wheel when attached thereto, said pulse actuated clutch being driven between said first and second states by application of a selected control condition for a given interval;

a driver operable mode switch indicating a desired mode of vehicle operation and specifying operation of said pulse actuated clutch in one of said first and second states;

a timer element; and a control element responsive to said mode switch and causing application of said selected control condition, said control element actuating said timer element as representation that completion of said given interval is pending, said control element interrogating said timer element prior to initiating application of said selected control condition and delaying application of said selected control condition when said timer indicates that completion of said given interval is pending.

2. A clutch mechanism and control arrangement according to claim 1 wherein said selected control condition comprises application of selected fluid pressure to said pulse actuated clutch mechanism for said given interval.

3. A clutch mechanism and control arrangement according to claim 2 wherein said selected fluid pressure is selected air pressure at a first magnitude to drive said pulse actuated clutch into said first state and at a second magnitude to drive said pulse actuated clutch into said second state.

4. A clutch mechanism and control arrangement according to claim 1 wherein said selected control condition includes a first component applied during a first portion of said given interval and driving said pulse actuated clutch into one of said first and second states, and includes a second component applied during a second portion of said given interval and stabilizing said pulse actuated clutch in one of said first and second states.

5. A clutch mechanism and control arrangement according to claim 4 wherein said first component comprises application of selected fluid pressure to said pulse actuated clutch and said second component comprises venting of fluid pressure from said pulse actuated clutch.

6. A clutch mechanism and control arrangement according to claim 5 wherein said selected fluid pressure is negative air pressure relative to ambient air pressure.

7. A clutch mechanism and control arrangement according to claim 1 wherein said control element monitors an indication of available energy to accomplish transition of said pulse actuated clutch mechanism between said first and second states during a first given interval, and restarts application of said control signal for a second given interval when said indication of available energy indicates a lack of available energy during said first given interval.

8. A clutch mechanism and control arrangement according to claim 7 wherein said indication of available energy comprises a vehicle ignition switch.

9. A clutch mechanism and control arrangement providing selected coupling and decoupling of a vehicle wheel relative to a vehicle drive line, the clutch mechanism and control arrangement comprising:

at least one pulse actuated clutch attachable to said vehicle drive line and to said vehicle wheel, said pulse actuated clutch operable in a first state coupling said drive line and said wheel when attached thereto and operable in a second state decoupling said drive line and said wheel when attached thereto, said pulse actuated clutch being driven between said first and second states by application of a first control condition for a first time interval and a second control condition for a second time interval subsequent to said first time interval;

a driver operable mode switch indicating a desired mode of vehicle operation and specifying operation of said pulse actuated clutch in one of said first and second states;

a first timer element;

a second timer element; and a control element responsive to said mode switch and causing application of said first and second control conditions, said control element actuating said first timer element as representation that completion of said first time interval is pending, said control element actuating said second timer element as representation that completion of said second time interval is pending, said control element interrogating said first and second timer elements prior to initiating application of said first control condition, said control element delaying application of said first control condition when said first timer indicates that completion of said first interval is pending and delaying application of said first control condition when said second timer indicates that completion of said second time interval is pending.

10. A clutch mechanism and control arrangement according to claim 9 wherein said first control condition comprises application of selected negative air pressure to said pulse actuated clutch mechanism for said given interval.

11. A clutch mechanism and control arrangement according to claim 10 wherein said selected negative air pressure is a first magnitude to drive said pulse actuated clutch from said first state to said second state and a second magnitude to drive said pulse actuated clutch from said second state to said first state.

12. A clutch mechanism and control arrangement according to claim 9 wherein said second control condition comprises venting of air pressure within said pulse actuated clutch mechanism relative to ambient air pressure.

13. A method of controlling a pulse actuated clutch mechanism, the pulse actuated clutch mechanism being operable in a first state coupling a vehicle drive line to a wheel and operable in a second state decoupling the vehicle drive line from the wheel, said pulse actuated clutch mechanism being driven between said first and second states by application of a selected first control condition for a first time interval and application of a second control condition for a second time interval, the method of controlling comprising the steps:

monitoring a driver operable mode switch specifying operation of said pulse actuated switch in one of said first and second states and detecting change in said mode switch; and in response to detected change in said mode switch, interrogating a timer element indicating that completion of at least one of said first and second time intervals is pending and delaying further state transition control until completion of said at least one of said first and second time intervals, setting said timer to measure said first time interval and subsequently applying said first control condition until expiration of said timer, setting said timer to measure said second time interval and subsequently applying said second control condition to accomplish transition of said pulse actuated clutch to one of said first and second states.

14. A method according to claim 13 wherein application of said first control condition comprises the step of applying selected magnitude air pressure to said pulse actuated clutch mechanism.

15. A method according to claim 14 wherein said selected magnitude air pressure is negative air pressure relative to ambient air pressure, said selected magnitude being a first magnitude to drive said pulse actuated clutch from said first state to said second state and a second magnitude to drive said pulse actuated clutch from said second state to said first state.

16. A method according to claim 13 further comprising the step of monitoring an indication of available energy used to accomplish transition of said pulse actuated clutch mechanism through said first time interval, and re-initiating said first time interval when said monitoring step indicates a lack of available energy during said first time interval.

* * * * *